United States Patent
Parker et al.

(10) Patent No.: US 11,718,047 B2
(45) Date of Patent: Aug. 8, 2023

(54) FLYAWAY STRINGER END CAPS

(71) Applicant: The Boeing Company, Chicago, IL (US)

(72) Inventors: Mary LeAnn Parker, Snohomish, WA (US); Khanh Mai Pham, Renton, WA (US); Lisa Christina Carlson, Auburn, WA (US); Garrett Charles Hanson, Everett, WA (US)

(73) Assignee: The Boeing Company, Chicago, IL (US)

( * ) Notice: Subject to any disclaimer, the term of this patent is extended or adjusted under 35 U.S.C. 154(b) by 636 days.

(21) Appl. No.: 16/712,154

(22) Filed: Dec. 12, 2019

(65) Prior Publication Data
US 2021/0178706 A1     Jun. 17, 2021

(51) Int. Cl.
| | | |
|---|---|---|
| *B29C 65/00* | (2006.01) | |
| *B29C 70/00* | (2006.01) | |
| *B29C 70/38* | (2006.01) | |
| *B29C 65/78* | (2006.01) | |

(Continued)

(52) U.S. Cl.
CPC .......... *B29C 70/38* (2013.01); *B29C 65/7814* (2013.01); *B29C 65/7847* (2013.01); *B29L 2031/3085* (2013.01); *B32B 5/24* (2013.01); *B32B 2250/02* (2013.01); *B32B 2262/106* (2013.01); *B32B 2605/18* (2013.01)

(58) Field of Classification Search
CPC ......... B29C 65/00; B29C 65/70; B29C 65/78; B29C 65/781; B29C 65/7814; B29C 70/00; B29C 70/30; B29C 70/38
See application file for complete search history.

(56) References Cited

U.S. PATENT DOCUMENTS

| | | |
|---|---|---|
| 3,780,929 A | 12/1973 | Terrasi |
| 4,334,124 A | 6/1982 | Imsand et al. |
| 4,498,139 A | 2/1985 | Malinovsky |

(Continued)

FOREIGN PATENT DOCUMENTS

| | | |
|---|---|---|
| CA | 2829899 A1 | 4/2015 |
| EP | 1050396 A1 | 11/2000 |

(Continued)

OTHER PUBLICATIONS

Althof et al; Investigations of Cemented and Detachable Joints of Fiber Reinforced Plastics. Translation of Untersuchungen an geklebten und loesbaren Verbindungen von faserverstaerkten Kunststoffen, Kunststoffe, vol. 60 No. 12, 1970 pp. 911-916, NASA Technical Translation, NASA TT F-14,041, Dec. 1971, 19 pages.

(Continued)

*Primary Examiner* — Jacob T Minskey
*Assistant Examiner* — Matthew Hoover
(74) *Attorney, Agent, or Firm* — Yee & Associates, P.C.

(57) ABSTRACT

Systems and methods are provided for fabricating composite parts. One embodiment is a method for fabricating a composite part. The method includes forming a skin panel preform comprising fiber reinforced material, disposing rigid end caps at the skin panel preform at end locations of stringer preforms that will be placed at the skin panel, locating the stringer preforms at the skin panel preform via the rigid end caps, and anchoring the stringer preforms to the skin panel preform.

20 Claims, 20 Drawing Sheets

(51) Int. Cl.
  *B29L 31/30*    (2006.01)
  *B32B 5/24*     (2006.01)

(56) References Cited

U.S. PATENT DOCUMENTS

| | | |
|---|---|---|
| 4,666,546 A | 5/1987 | Treber |
| 4,849,913 A | 7/1989 | Ward et al. |
| 4,907,164 A | 3/1990 | Guyder |
| 5,006,990 A | 4/1991 | Ward et al. |
| 5,031,457 A | 7/1991 | Kline |
| 5,038,291 A | 8/1991 | Wang et al. |
| 5,119,309 A | 6/1992 | Cavendish et al. |
| 5,216,612 A | 6/1993 | Cornett et al. |
| 5,452,407 A | 9/1995 | Crook |
| 5,984,511 A | 11/1999 | Vasey-Glandon et al. |
| 6,041,132 A | 3/2000 | Isaacs et al. |
| 6,052,631 A | 4/2000 | Busch et al. |
| 6,138,056 A | 10/2000 | Hardesty et al. |
| 6,253,218 B1 | 6/2001 | Aoki et al. |
| 6,278,457 B1 | 8/2001 | Bernardini et al. |
| 6,341,261 B1 | 1/2002 | Vasey-Glandon et al. |
| 6,356,437 B1 | 3/2002 | Mitchell et al. |
| 6,407,738 B1 | 6/2002 | Wakabayashi |
| 6,445,390 B1 | 9/2002 | Aftosmis et al. |
| 6,484,776 B1 | 11/2002 | Meilunas et al. |
| 6,502,489 B2 | 1/2003 | Gerent et al. |
| 6,625,618 B1 | 9/2003 | Arai |
| 6,629,302 B2 | 9/2003 | Miura et al. |
| 6,690,159 B2 | 2/2004 | Burreson et al. |
| 6,799,081 B1 | 9/2004 | Hale et al. |
| 6,819,966 B1 | 11/2004 | Haeberli |
| 6,843,565 B2 | 1/2005 | Evans et al. |
| 6,879,872 B2 | 4/2005 | Fukumura |
| 6,959,235 B1 | 10/2005 | Abdel-Malek et al. |
| 7,006,087 B2 | 2/2006 | Takagi |
| 7,010,472 B1 | 3/2006 | Vasey-Glandon et al. |
| 7,058,472 B2 | 6/2006 | Mathews et al. |
| 7,076,323 B2 | 7/2006 | Vanderwiel |
| 7,079,996 B2 | 7/2006 | Stewart et al. |
| 7,099,725 B2 | 8/2006 | Murrish et al. |
| 7,159,112 B1 | 1/2007 | Williams |
| 7,171,344 B2 | 1/2007 | Lind |
| 7,243,055 B2 | 7/2007 | Chen et al. |
| 7,244,230 B2 | 7/2007 | Duggirala et al. |
| 7,324,103 B2 | 1/2008 | Stewart et al. |
| 7,365,747 B2 | 4/2008 | Finlayson et al. |
| 7,366,643 B2 | 4/2008 | Verdura et al. |
| 7,376,480 B2 | 5/2008 | Hagen et al. |
| 7,407,556 B2 | 8/2008 | Oldani et al. |
| 7,423,523 B2 | 9/2008 | Green |
| 7,424,543 B2 | 9/2008 | Rice |
| 7,513,965 B2 | 4/2009 | Oldani et al. |
| 7,526,418 B2 | 4/2009 | Pita et al. |
| 7,545,274 B2 | 6/2009 | Coop |
| 7,555,404 B2 | 6/2009 | Brennan et al. |
| 7,561,996 B2 | 7/2009 | Lu et al. |
| 7,617,029 B2 | 11/2009 | Loda |
| 7,720,561 B2 | 5/2010 | Tang et al. |
| 7,747,421 B2 | 6/2010 | Tang et al. |
| 7,751,917 B2 | 7/2010 | Rees et al. |
| 7,761,183 B2 | 7/2010 | Sullivan |
| 7,761,713 B2 | 7/2010 | Baar |
| 7,769,481 B2 | 8/2010 | Tang et al. |
| 7,809,454 B2 | 10/2010 | Hu et al. |
| 7,809,531 B2 | 10/2010 | Murrish |
| 7,809,679 B2 | 10/2010 | Nixon et al. |
| 7,810,025 B2 | 10/2010 | Blair et al. |
| 7,823,062 B2 | 10/2010 | Liberty et al. |
| 7,869,982 B2 | 1/2011 | Drumheller et al. |
| 7,912,602 B2 | 3/2011 | Sells et al. |
| 7,983,809 B2 | 7/2011 | Kell et al. |
| 8,103,101 B2 | 1/2012 | Fujiwara et al. |
| 8,108,058 B2 | 1/2012 | Murrish et al. |
| 8,165,703 B2 | 4/2012 | Burgos Gallego et al. |
| 8,209,838 B2 | 7/2012 | Lindgren |
| 8,285,407 B2 | 10/2012 | Kessel et al. |
| 8,652,606 B2 * | 2/2014 | Griess ............... B32B 5/26 |
| | | 428/58 |
| 8,894,801 B2 | 11/2014 | Griess et al. |
| 2001/0045148 A1 | 11/2001 | Gerent et al. |
| 2001/0047508 A1 | 11/2001 | Miura et al. |
| 2002/0077752 A1 | 6/2002 | Burreson et al. |
| 2002/0077968 A1 | 6/2002 | Kaniwa et al. |
| 2002/0174010 A1 | 11/2002 | Rice |
| 2002/0183986 A1 | 12/2002 | Stewart et al. |
| 2003/0055812 A1 | 3/2003 | Williams et al. |
| 2003/0080957 A1 | 5/2003 | Stewart et al. |
| 2003/0120472 A1 | 6/2003 | Lind |
| 2003/0145017 A1 | 7/2003 | Patton et al. |
| 2003/0191554 A1 | 10/2003 | Russell et al. |
| 2004/0021828 A1 | 2/2004 | Evans et al. |
| 2004/0024661 A1 | 2/2004 | Freel et al. |
| 2004/0139330 A1 | 7/2004 | Baar |
| 2004/0147840 A1 | 7/2004 | Duggirala et al. |
| 2004/0177060 A1 | 9/2004 | Nixon et al. |
| 2004/0236561 A1 | 11/2004 | Smith et al. |
| 2005/0055181 A1 | 3/2005 | Verdura et al. |
| 2005/0119774 A1 | 6/2005 | Murrish et al. |
| 2005/0240291 A1 | 10/2005 | Oldani et al. |
| 2005/0241261 A1 | 11/2005 | Martinez-Cepeda |
| 2005/0247396 A1 | 11/2005 | Oldani et al. |
| 2006/0015777 A1 | 1/2006 | Loda |
| 2006/0041840 A1 | 2/2006 | Blair et al. |
| 2006/0119601 A1 | 6/2006 | Finlayson et al. |
| 2006/0265198 A1 | 11/2006 | Kanai et al. |
| 2006/0291724 A1 | 12/2006 | Fujiwara et al. |
| 2007/0073429 A1 | 3/2007 | Rees et al. |
| 2007/0106418 A1 | 5/2007 | Hagen et al. |
| 2007/0150087 A1 | 6/2007 | Tang et al. |
| 2007/0191982 A1 | 8/2007 | Sullivan |
| 2007/0236354 A1 | 10/2007 | Green |
| 2007/0241908 A1 | 10/2007 | Coop |
| 2007/0244590 A1 | 10/2007 | Menayo et al. |
| 2008/0312764 A1 | 12/2008 | Murrish |
| 2009/0005928 A1 | 1/2009 | Sells et al. |
| 2009/0043533 A1 | 2/2009 | Brennan et al. |
| 2009/0076638 A1 | 3/2009 | Hu et al. |
| 2009/0112540 A1 | 4/2009 | Kessel et al. |
| 2009/0112820 A1 | 4/2009 | Kessel et al. |
| 2009/0112973 A1 | 4/2009 | Kessel et al. |
| 2009/0138139 A1 | 5/2009 | Tsai et al. |
| 2009/0320398 A1 | 12/2009 | Gouvea |
| 2010/0042283 A1 | 2/2010 | Kell et al. |
| 2010/0161095 A1 | 6/2010 | Lindgren |
| 2011/0082681 A1 | 4/2011 | Teramae et al. |
| 2011/0087463 A1 | 4/2011 | Nakhle et al. |
| 2012/0100343 A1 * | 4/2012 | Borghini-Lilli .... B29D 99/0014 |
| | | 428/156 |
| 2013/0209746 A1 | 8/2013 | Reighley et al. |
| 2018/0001590 A1 | 1/2018 | Carlson et al. |
| 2018/0001991 A1 | 1/2018 | Charles |
| 2019/0366653 A1 | 12/2019 | Carlson et al. |

FOREIGN PATENT DOCUMENTS

| | | |
|---|---|---|
| EP | 1296103 A2 | 3/2003 |
| EP | 1503301 A2 | 2/2005 |
| EP | 1840775 A1 | 10/2007 |
| JP | 2000298734 A | 10/2000 |
| JP | 2004264993 A | 9/2004 |
| JP | 2006350499 A | 12/2006 |
| WO | 0056541 A1 | 9/2000 |
| WO | 2009055201 A2 | 4/2009 |
| WO | 2009070410 A1 | 6/2009 |
| WO | 2010019328 A1 | 2/2010 |
| WO | 2011046686 A1 | 4/2011 |
| WO | 2012024023 A1 | 2/2012 |

OTHER PUBLICATIONS

Cera et al, Role-based viewing envelopes for information protection in collaborative modeling, Computer-Aided Design, col. 36, No. 9, Aug. 2004, pp. 873-886.

(56) References Cited

OTHER PUBLICATIONS

Ding et al, XML-based Representation in Product Lifestyle management, Proceedings of the 2007 11th International conference on computer Supported cooperative work in Design (CSCWD 2007) Apr. 2007, pp. 762-767.
Final Office Action, dated Dec. 27, 2010, U.S. Appl. No. 11/924,107, 21 pages.
Final Office Action, dated Nov. 9, 2011, U.S. Appl. No. 12/192,162, 1 pages.
Final Office Action, dated Oct. 28, 2011, U.S. Appl. No. 11/945,121, 15 pages.
Final Office Action, dated Sep. 30, 2011, U.S. Appl No. 12/192,168, 13 pages.
Fink et al, Hybrid CFRP/titanium bolted joints, Performance assessment and application to a spacecraft payload adaptor, Composites Science and Technology, Feb. 2010, vol. 70, Issue 2, pp. 305-317.
Fink et al, Hybrid Titanium Composite Material Improving Composite Structure Coupling. In Proceedings of the 20th AAAF Coloquium, Materials for Aerospace Applications, Nov. 2003, 7 pages.
Griess et al, Composite Structures Having Composite-To-Metal Joints and Method for Making the Same. U.S. Appl. No. 13/716,171 and Preliminary Amendment filed Dec. 16, 2012 39 pages.
Griess et al, Multy-Layer Metallic Structure and Composite-to-Metal joint Methods, U.S. Appl. No. 13/443,687, filed Apr. 2012, 55 pages.
Guillermin et al, Advanced CAD software Tools for cost-Effective composite Engineering, Proceedings of the 46th Internation SAMPE Symposium, vol. 2, May 2001, pp. 1899-1910.
International Search Report and Written Opinion dated Jan. 25, 2011, Appl No. PCT/US2010/047886, 13 pages.
International Search Report and Written Opinion dated Mar. 5, 2009; Appl No. PCT/US2008/081793, 14 pages.
International Search Report and Written Opinion dated Oct. 15, 2009, Appl No. PCT/US2009/049931, 12 pages.
International Search Report and Writtne Opinion dated Aug. 5, 2011, Appl No. PCT/US2011/041519 (WO2012024023, 10 pages.
International Search Report dated Jun. 8, 2009, Application No. PCT/US2008/078095, 4 pages.
Kanga, Application of Intelligent Computer-Aided Design Techniquest to Power Plant Design and Operation, IEEE Transaction on Energy conversion, vol. EC-2, No. 4, Dec. 1987, pp. 592-597.
Kolesnikov et al, CFRP/titanium hybrid materials for improving composite bolted joints, Composites Structures, Jun. 2008, vol. 83, No. 4, pp. 368-380.
Notice of Allowance dated Jan. 15, 2013 re U.S. Appl. No. 12/192,168, 19 pages.
Notice of Allowance, dated Feb. 17, 2012, U.S. Appl. No. 12/192,162, 9 pages.
Notice of Allowance, dated Jul. 20, 2012, U.S. Appl. No. 11/924,107, 18 pages.
Notice of Allowance, dated May 21, 2012, U.S. Appl. No. 12/192,162, 16 pages.
Office Action dated Apr. 29, 2011, U.S. Appl. No. 11/945,121, 16 pages.
Office Action, dated Apr. 5, 2011, U.S. Appl No. 12/192,168, 21 pages.
Office Action, dated Aug. 3, 2012, U.S. Appl. No. 12/192,168, 27 pages.
Office Action, dated Dec. 7, 2011, U.S. Appl. No. 11/924,107, 32 pages.
Office Action, dated Jul. 20, 2011, U.S. Appl. No. 12/192,162, 29 pages.
Office Action, dated Sep. 9, 2010, Appl No. 11/924,107, 25 pages.
Prakash et al, Computer Graphics in the Design and Manufacture of Composite Laminate Components, Computers & Graphics, col. 17, No. 4, Jul. 1993, pp. 407-413.
European Search Report; Application EP20213798; dated Apr. 30, 2021.
Office Action, dated Jan. 10, 2023, regarding U.S. Appl. No. 16/712,089, 29 pages.

\* cited by examiner

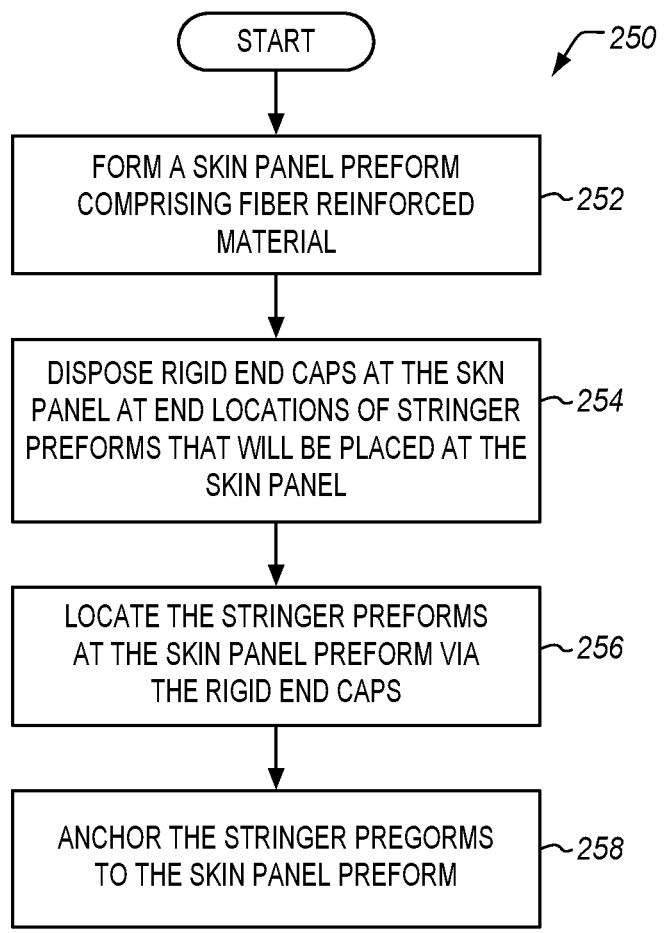

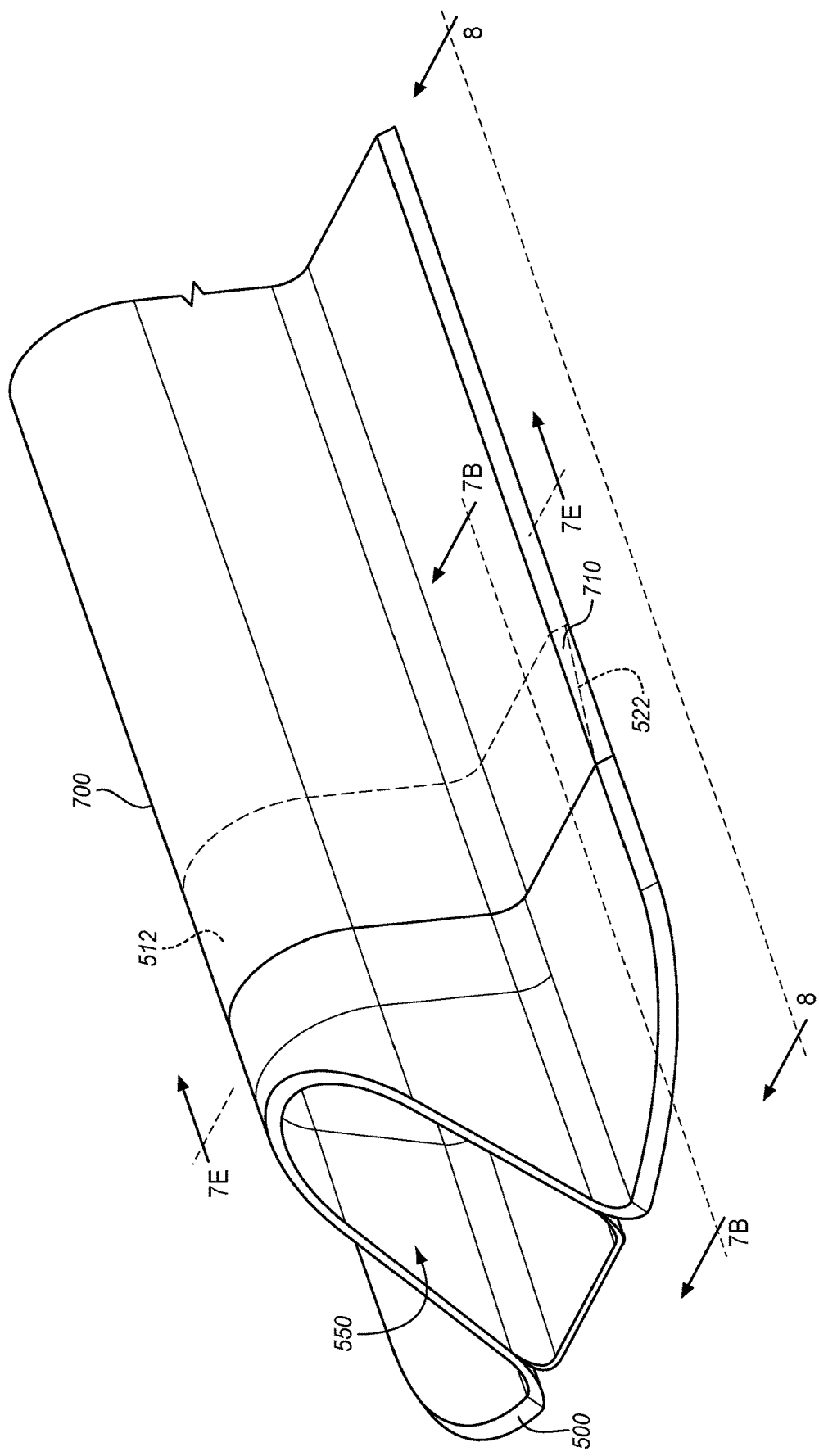

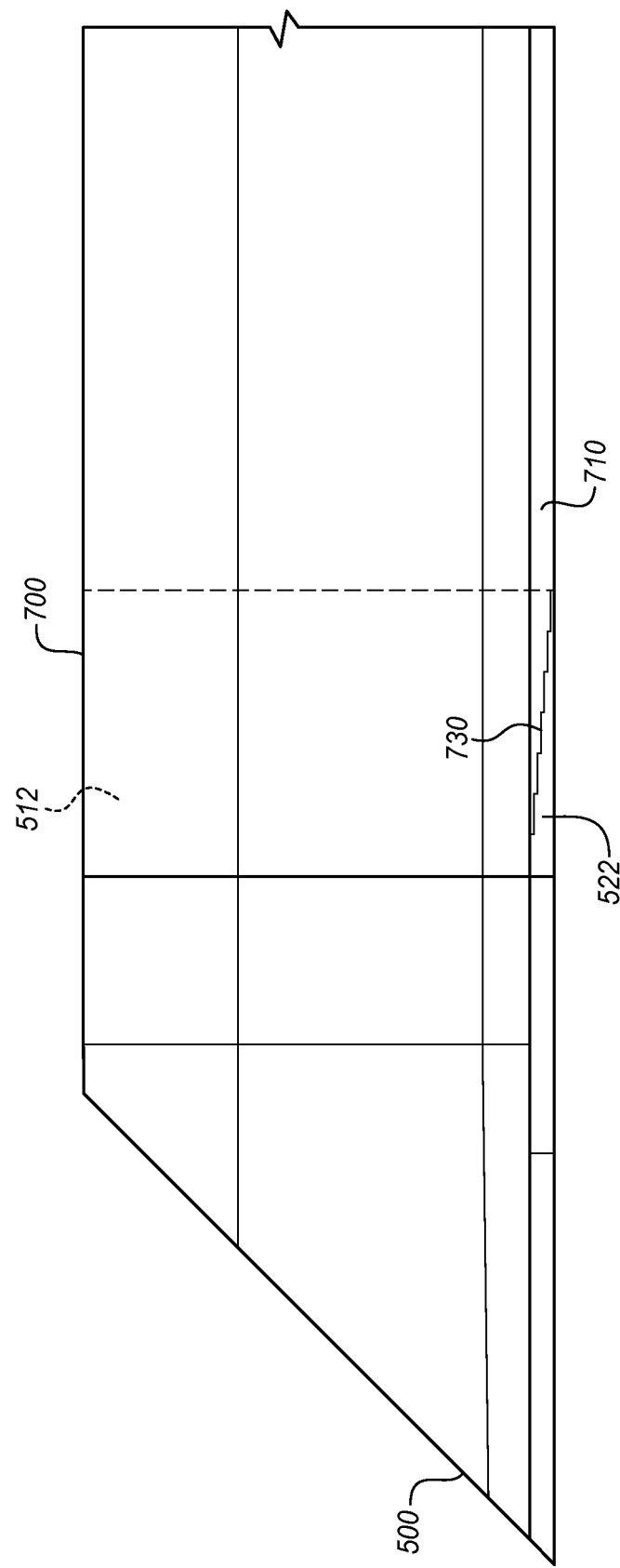

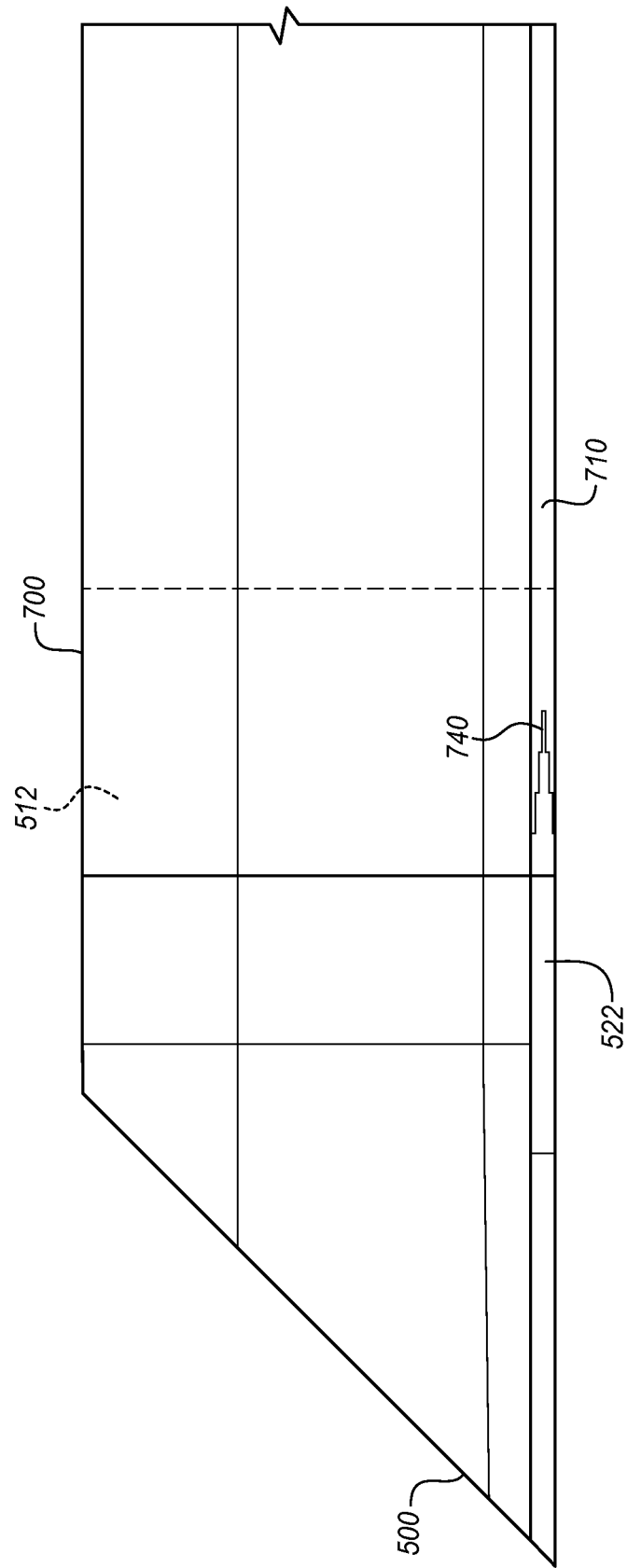

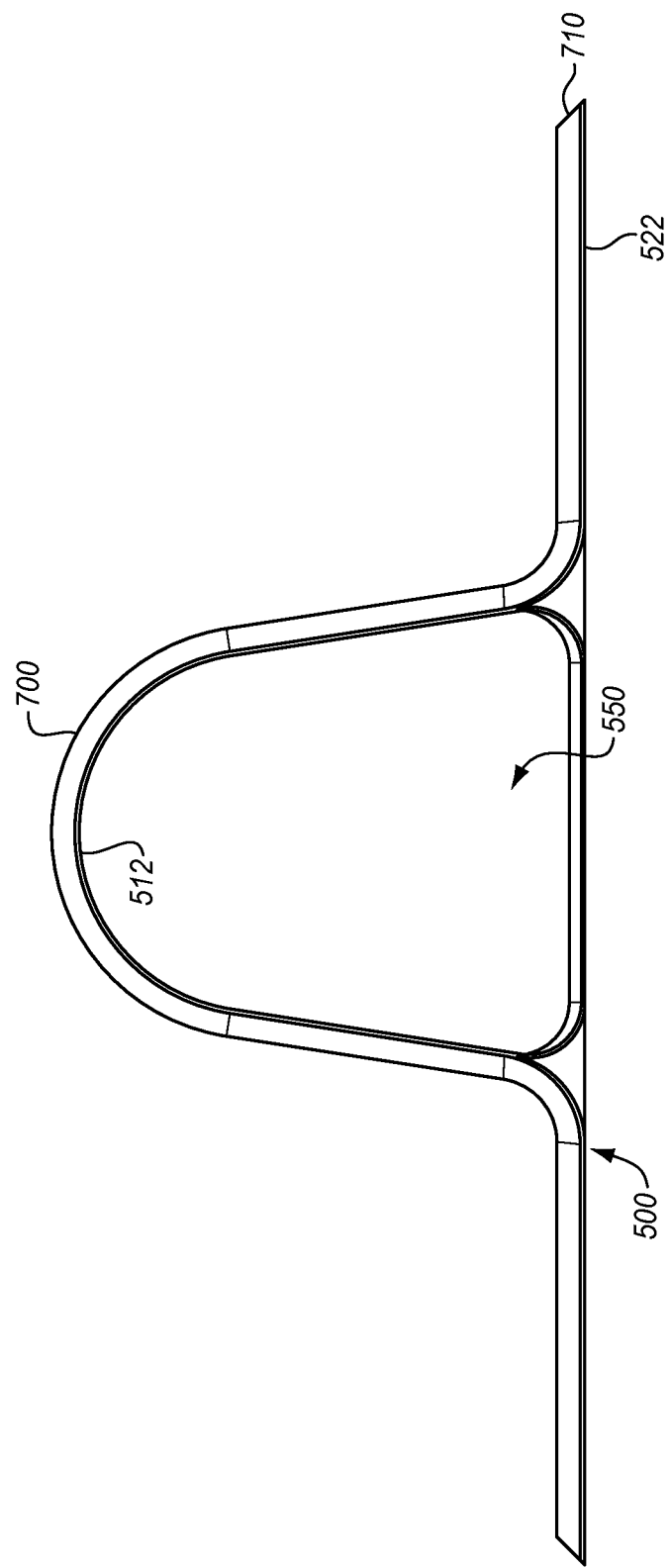

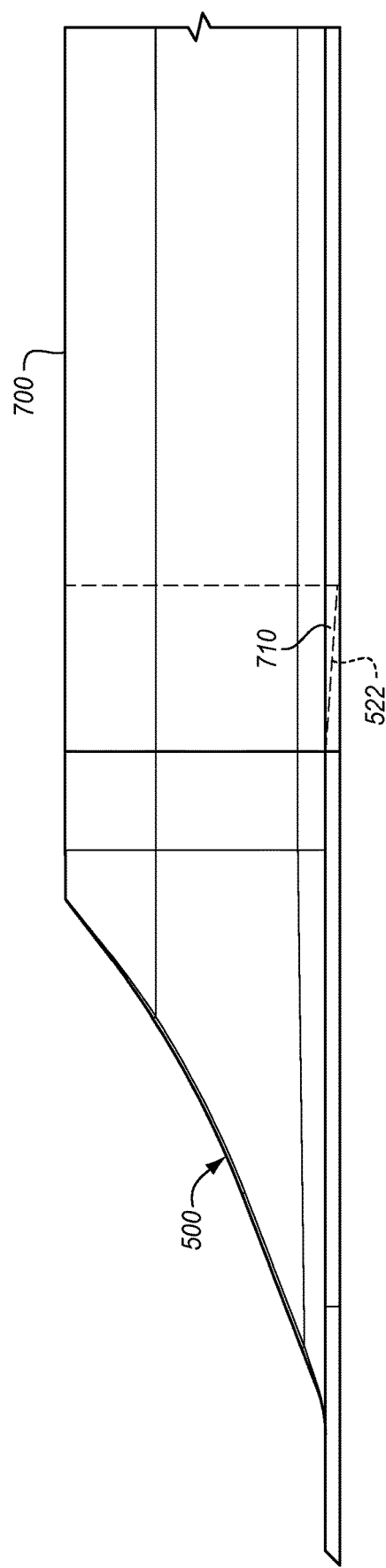

FLYAWAY STRINGER END CAPS

FIELD

The disclosure relates to the field of fabrication, and in particular, to fabrication of stringers for aircraft.

BACKGROUND

Stringers for an aircraft (e.g., the wings of an aircraft) may be fabricated from composite materials. These stringers may be laid-up as preforms, processed into stringers, and then co-cured to a wing skin in order to form a completed wing or portion thereof. When stringers are fabricated in this manner, the stringers are laid-up and cured such that they terminate within the wing skin. The stringers can then be cut to desired dimensions at desired ramp rates after curing has completed. The transition from stringer to skin is commonly referred to as a "stringer run-out" and is utilized for transferring load in composite wing structures.

Fabricating a stringer made of composite materials in this manner may result in edge conditions which are out of tolerance or, and out of tolerance conditions are undesirable as they may necessitate rework. At the same time, it may be difficult to lay up and cure a preform at desired ramp rates, owing to the complex geometries that may be required.

Therefore, it would be desirable to have a method and apparatus that take into account at least some of the issues discussed above, as well as other possible issues.

SUMMARY

Embodiments described herein provide rigid end caps for stringers that exhibit desired ramp rates and stringer run-out quality for terminating a stringer. These end caps are affixed to preforms for the stringers to form integral portions of a composite part. The end caps eliminate the need to shape the preforms to specified ramp rates, while also eliminating the need to cut the stringers after curing. The end caps form flyaway tooling that enforces desired shapes onto stringers during curing, while also bearing and transferring loads within the wing after the wing has been fabricated. One embodiment is a method of forming a stringer. The method includes laying up a stringer preform comprising fiber-reinforced material, placing the stringer preform onto a skin panel preform, bonding an end cap to the stringer preform and the skin panel preform, and co-curing the stringer preform and the skin panel preform while the end cap is bonded to the stringer preform and the skin panel preform, resulting in a composite part that includes the end cap.

One embodiment is a method for fabricating a composite part. The method includes forming a skin panel preform comprising fiber reinforced material, disposing rigid end caps at the skin panel preform at end locations of stringer preforms that will be placed at the skin panel, locating the stringer preforms at the skin panel preform via the rigid end caps, and anchoring the stringer preforms to the skin panel preform.

A further embodiment is an apparatus for receiving a stringer preform. The apparatus includes a skin panel preform comprising fiber reinforced material, and rigid end caps that are disposed atop the skin panel preform and are separated by a length of a stringer preform that will be placed onto the skin panel preform.

A further embodiment is a non-transitory computer readable medium embodying programmed instructions which, when executed by a processor, are operable for performing a method for forming a stringer. The method includes forming a skin panel preform comprising fiber reinforced material, disposing rigid end caps at the skin panel preform at end locations of stringer preforms that will be placed at the skin panel, locating the stringer preforms at the skin panel preform via the rigid end caps, and anchoring the stringer preforms to the skin panel preform.

A further embodiment is a system that forms a portion of an aircraft. The system includes a section of airframe comprising a skin panel comprising fiber reinforced material, stringers that are affixed to the skin panel and that comprise fiber reinforced material, and rigid end caps that are integral with the skin panel and the stringers, the rigid end caps comprising flyaway tooling that supported the stringers during hardening.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 2B is a flowchart illustrating a method for integrating flyaway tooling into a wing in an illustrative embodiment.

FIGS. 7A-7E and 8 illustrate a co-bonded end cap and stringer in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

Figure 1:
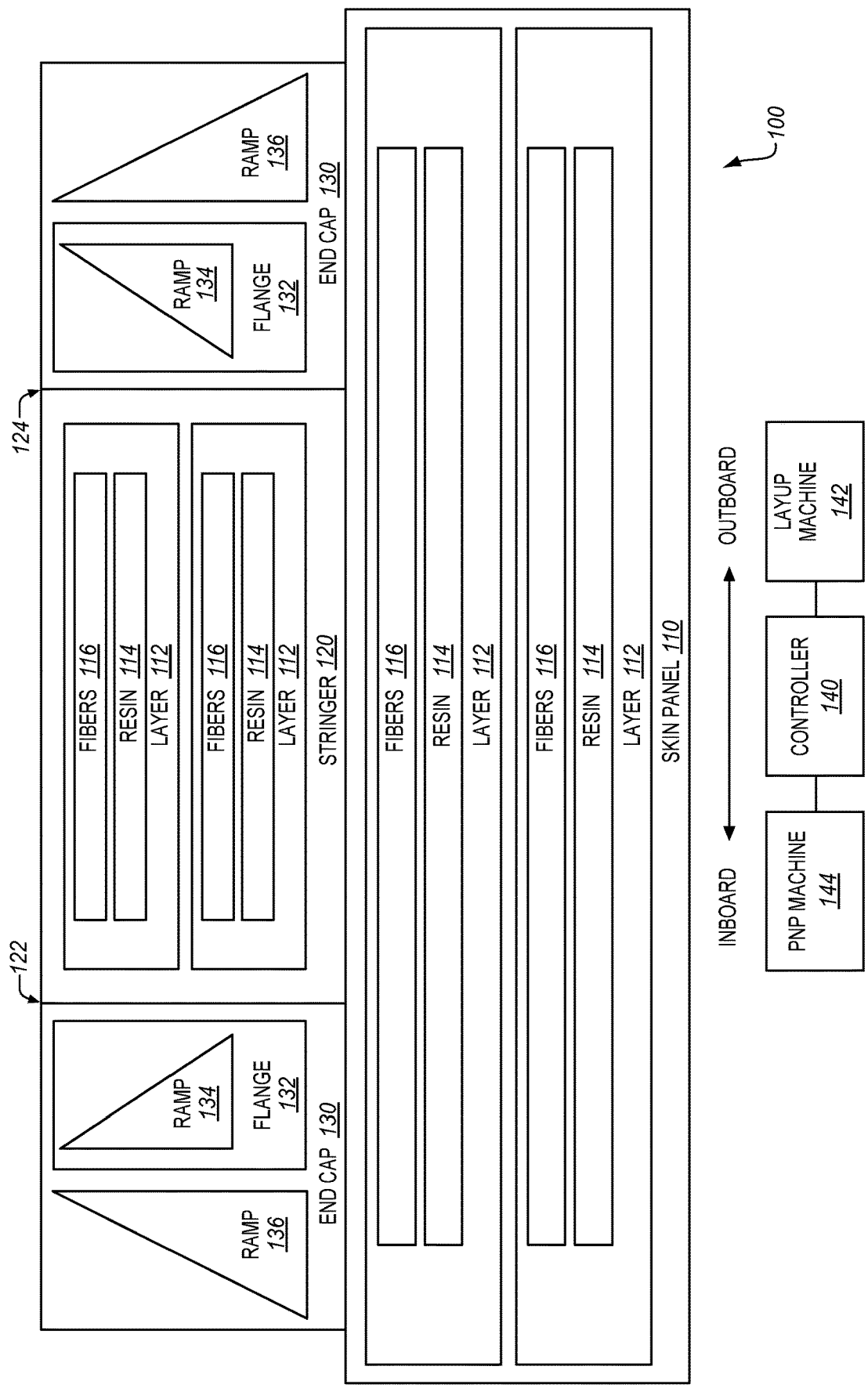
FIG. 1 is a block diagram of one half of a wing that includes co-cured stringers and flyaway tooling in an illustrative embodiment.

FIG. 1 is a block diagram of a lower half of a wing 100 that includes co-cured stringers and flyaway tooling in an illustrative embodiment. The lower half of the wing 100 illustrated in FIG. 1 may comprise a co-cured lower half of a wing, and is capable of being affixed or bonded to an upper half of a wing in order to form a complete wing. In further embodiments, an upper half of a wing is assembled in a similar manner to that of the lower half of the wing 100. The lower half of a wing 100 depicted in FIG. 1 includes fiber-reinforced composite materials as well as rigid end caps for stringers. This arrangement eliminates the need for trimming or cutting the stringers at the wing 100 after hardening.

In this embodiment, FIG. 1 depicts a portion of a wing that includes a skin panel 110, which comprises fiber-reinforced material in the form of multiple layers 112 of resin 114 and fibers 116. A stringer 120 is disposed atop the skin panel 110, and comprises fiber-reinforced material in the form of layers 112 of fibers 116 and resin 114. The stringer 120 is co-cured to the skin panel 110.

End caps 130 abut the inboard end 122 and outboard end 124 of the stringer 120. The end caps 130 are rigid prior to curing, and may comprise a metal that provides high strength with low weight, such as titanium or aluminum (e.g., isolated from carbon fiber by isolation plies of fiberglass or other material). End caps 130 may further comprise hardened composite materials (e.g., thermoset or thermoplastic), as well as 3D-printed metals. Thus, in one embodiment the end caps 130 are fabricated via additive manufacturing techniques, such as 3D printing. In further embodiments, subtractive manufacturing techniques are utilized. Each end cap 130 includes a flange 132 with a ramp 134 for receiving the stringer 120. The end caps 130 are bolted and/or bonded to the stringer 120 and/or skin panel 110.

The ramp 134 provides a pathway for transferring load from the stringer 120 to the end cap 130. As used herein, a "ramp" refers to any physical structure that transitions load along its length, including step laps, scarfing, interleaving, linear ramps, and other features. The stringer 120 itself includes a flange and web, and these structures are complementary to the ramp 134 of the end cap 130. Each end cap 130 also includes a ramp 136 that proceeds down to the skin panel 110. The ramp 136 provides a pathway for transferring load from the end cap 130 to the skin panel 110.

The end caps 130 are co-bonded to the stringers 120 and the skin panel 110, and the ramps 134 of the end caps 130 are overlapped with fiber-reinforced material from the stringers 120 in one embodiment. In further embodiments, the ramps 134 and/or 136 integrate with stringers 120 via laps, step laps, or scarf interleaving of the ramps with the plies of the stringer and/or skin panel 110. In some of these embodiments, the transitions involve laying up a stringer preform upon an end cap 130 to accommodate differences in shape. The terms of "skin panel 110" and "stringer 120" are utilized herein to refer to both uncured preforms as well as hardened composite parts. That is, a skin panel 110 may refer to an unhardened preform for a skin panel awaiting curing, or may refer to a hardened skin panel. In a similar fashion, a stringer 120 may refer to an unhardened preform for a stringer, or to a hardened stringer.

FIG. 1 further depicts components which may be electronically managed by controller 140 to fabricate the structure discussed above. In this embodiment, the components include a layup machine 142, such as an Automated Fiber Placement (AFP) machine or tape dispensing head that lays up tows of unidirectional fiber-reinforced material to form the layers 112. The components further include a Pick and Place (PNP) machine 144 (e.g., an end effector, suction device, gripper, etc.), which picks up and places stringer preforms and/or end caps 130 onto skin panel 110. In further embodiments, the stringer preforms and end caps 130 are manually picked and placed into position by one or more technicians. Controller 140 directs the operations of these components based on instructions stored in one or more Numerical Control (NC) programs in memory, and may be implemented, for example, as custom circuitry, as a hardware processor executing programmed instructions, or some combination thereof.

Illustrative details of the operation of the components of FIG. 1 will be discussed with regard to FIG. 2A. Assume, for this embodiment, that a skin panel preform (e.g., skin panel 110) for a wing has been laid-up by layup machine 142.

Figure 2A:
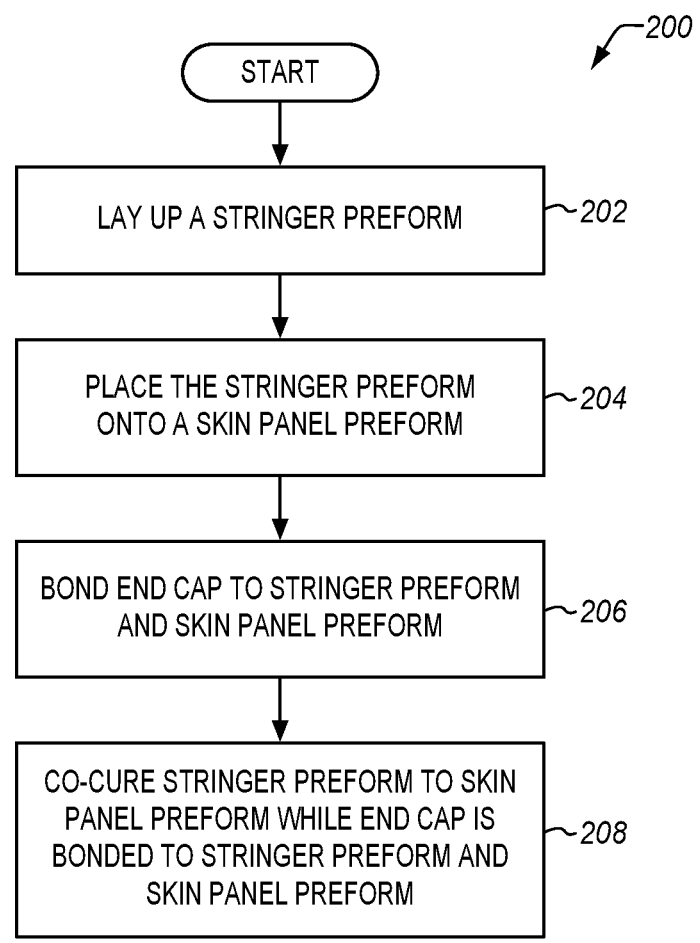
FIG. 2A is a flowchart illustrating a method for integrating flyaway tooling into a wing in an illustrative embodiment.

FIG. 2A is a flowchart illustrating a method 200 for integrating flyaway tooling into a wing in an illustrative embodiment. The steps of method 200 are described with reference to the lower half of a wing 100 shown in FIG. 1, but those skilled in the art will appreciate that method 200 may be performed for other portions of wings (e.g., upper halves of wings) in other environments. The steps of the flowcharts described herein are not all inclusive and may include other steps not shown. The steps described herein may also be performed in an alternative order.

In step 202, controller 140 directs layup machine 142 to lay up the stringer preform. In one embodiment, this comprises applying multiple layers of unidirectional fiber-reinforced material to a layup mandrel (not shown) or other piece of tooling that defines a shape for the stringer preform.

In one embodiment, the PNP machine 144 places an end cap 130 at each end of the stringer preform. The end caps 130 help to enforce a desired shape at the stringer preform before and during curing. Furthermore, the end caps 130 provide ramps 136 (e.g., for runouts) and/or other complex geometries in a rigid form, which means that these geometries do not need to be mechanically supported during the curing process. This reduces the complexity of layup and curing for the wing, which reduces expenses related to labor and materials.

In step 204, controller 140 directs the PNP machine 144 to place the stringer preform onto a skin panel preform (e.g., skin panel 110). During this operation, the stringer preform has not yet been cured (i.e., is still in the "green state") and therefore remains flaccid. The PNP machine 144 may therefore enforce or retain a desired curvature at the stringer preform via the application of suction (e.g., via a vacuum connection) or use of supporting structure while the stringer preform is being transported. In one embodiment, the PNP machine 144 picks up and places multiple stringer preforms at the skin panel preform. This may also include placing a stringer preform onto a layup mandrel and then laying up the skin against the stringer preform. For a skin panel that defines an upper portion of a wing, the stringers may comprise preforms for hat stringers. For a skin panel that defines a lower portion of a wing, the stringers may comprise preforms for "T" stringers. Further types of stringers include Z stringers, and stringers of any suitable cross-section. In one embodiment, the placement operation involves overlapping a ramp 134 of the end cap 130 with one or more layers of the stringer preform. This may comprise overlapping the ramp 134 with a ramp at the stringer preform. In this manner, after the stringer preform hardens, the ramp 134 transfers loads between the hardened stringer and the end cap 130. Meanwhile the ramp 136 transfers loads between the end cap 130 and the skin panel 110.

Step 206 comprises bonding an end cap 130 to the stringer preform and the skin panel preform. In one embodiment, this comprises applying an adhesive (e.g., an epoxy, glue, or other self-hardening chemical) to the end caps 130 prior to placing the end caps or the stringer preforms onto the skin panel preform, and waiting for the adhesive to harden after placing the end caps and stringer preform into position. In one embodiment, an end cap 130 is bonded to an outboard end of the stringer preform, and another end cap 130 is bonded to an inboard end of the stringer preform.

After the end caps 130 have been bonded into place, the position of end caps 130 with regard to the stringer preform and the skin panel preform is held in place by the hardened adhesive. This ensures that vacuum bagging setup and consolidation will not shift the position of the stringer preforms, skin panel preform, and end caps with respect to each other. Thus, PNP machine 144, another machine, or a technician, may proceed to vacuum bag the end cap, stringer preform, and skin panel preform (i.e., prior to co-curing these elements together). The end caps both anchor the stringer preforms to the skin panel preform, and locate the stringers at the skin panel preform. In one embodiment, the vacuum bag is utilized to consolidate these components via the application of pressure, prior to curing.

Step 208 comprises co-curing the stringer preform to the skin panel preform while the end caps 130 are bonded to the stringer preform and the skin panel preform, resulting in a composite part that includes the end caps 130 as integral components. In one embodiment, co-curing comprises placing the vacuum-bagged components into an autoclave, applying heat via the autoclave until resin 114 reaches a curing temperature, and applying pressure via the vacuum bag and/or via the autoclave in order to consolidate and cure the end caps 130, stringer preforms, and skin panel preform. These components are co-cured into an integral composite part that includes integral flyaway tooling. That is, the end caps 130 operate as tooling to provide support for the preforms during curing and vacuum bagging, and also provide mechanical strength when the resulting portion of wing is assembled into a portion of an airframe of an aircraft. The tooling becomes physically integral with stringers after hardening. Therefore, the tooling is flyaway tooling because it is integrated into an aircraft and "flies away" as part of the aircraft after fabrication has completed.

Method 200 provides a technical benefit over prior techniques, because it enables a runout to be rapidly integrated into a composite stringer, provides support during vacuum bagging and curing. This is because the end caps, being rigid prior to curing, resist compaction forces applied by a vacuum bag that could crush or bend elongated portions such as a web of a stringer preform. Hence, the end caps help to constrain stringer preforms to desired shapes during curing. Method 200 additionally eliminates the need to cut or remove material from a composite stringer after the composite stringer has been co-cured to a skin panel.

FIG. 2B illustrates a method 250 for integrating flyaway tooling into a wing in an illustrative embodiment. Method 250 comprises forming (e.g., laying up) a skin panel preform comprising fiber reinforced material (e.g., CFRP) in step 252, disposing rigid end caps at the skin panel preform at end locations of stringer preforms (e.g., laid-up from CFRP) that will be placed at the skin panel in step 254, locating the stringer preforms at the skin panel preform via the rigid end caps in step 256, and anchoring the stringer preforms to the skin panel preform in step 258.

In a further embodiment, method 250 includes consolidating the stringer preforms and the skin panel preform via a vacuum bag that covers the stringer preforms, skin panel preform, and end caps. Method 250 may further comprise hardening the stringer preforms and the skin panel preform to form a section of wing that includes the end caps. The end caps are bonded to the stringer preforms and the skin panel preform, and in one embodiment the method 250 further comprises co-curing the stringer preform and the skin panel preform while the rigid end caps are bonded to the stringer preform and the skin panel preform, resulting in a composite part that includes the end cap.

Figure 3:
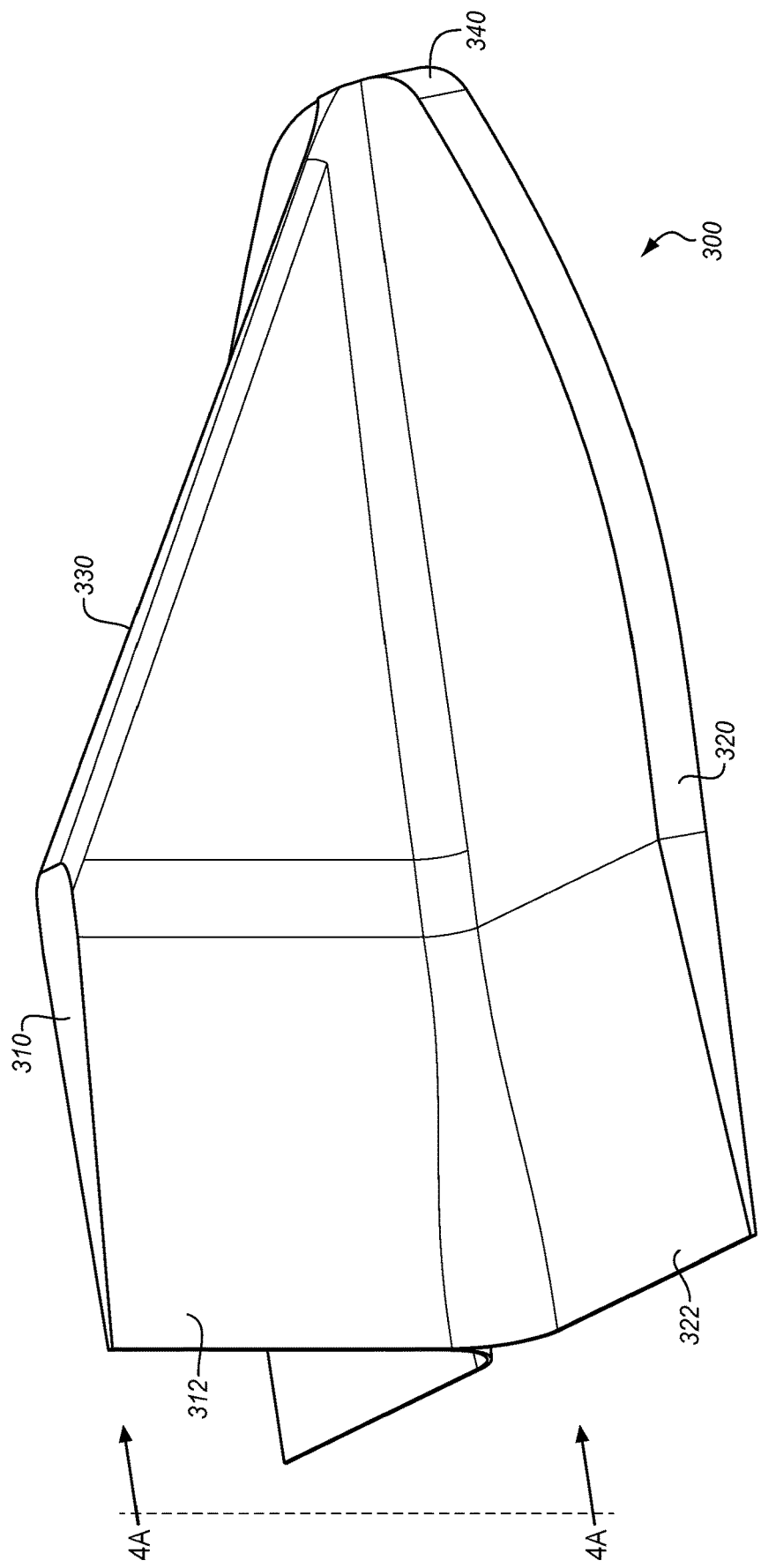
FIGS. 3 and 4A-4C illustrate an end cap for a first stringer shape in an illustrative embodiment.
Figure 4A:
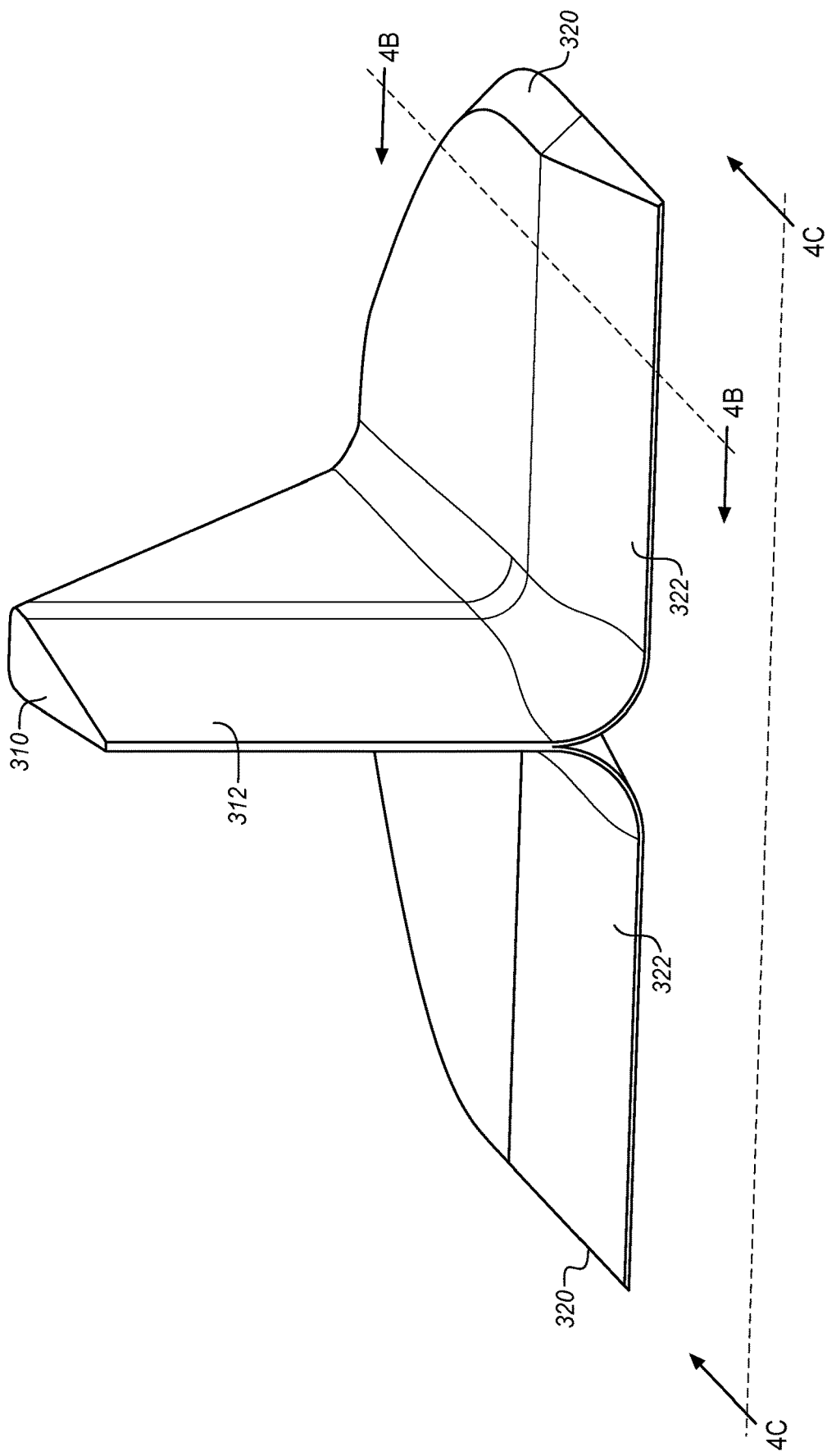

FIGS. 3 and 4A-4C illustrate an end cap 300 for a first stringer shape in an illustrative embodiment. FIG. 4A corresponds with view arrows 4A of FIG. 3. In this embodiment, the end cap 300 is designed as an end cap for a stringer having a T-shaped cross-section. That is, the end cap 300 has a T-shaped cross-section that aligns with a T-shaped cross section of a stringer.

Figure 5:
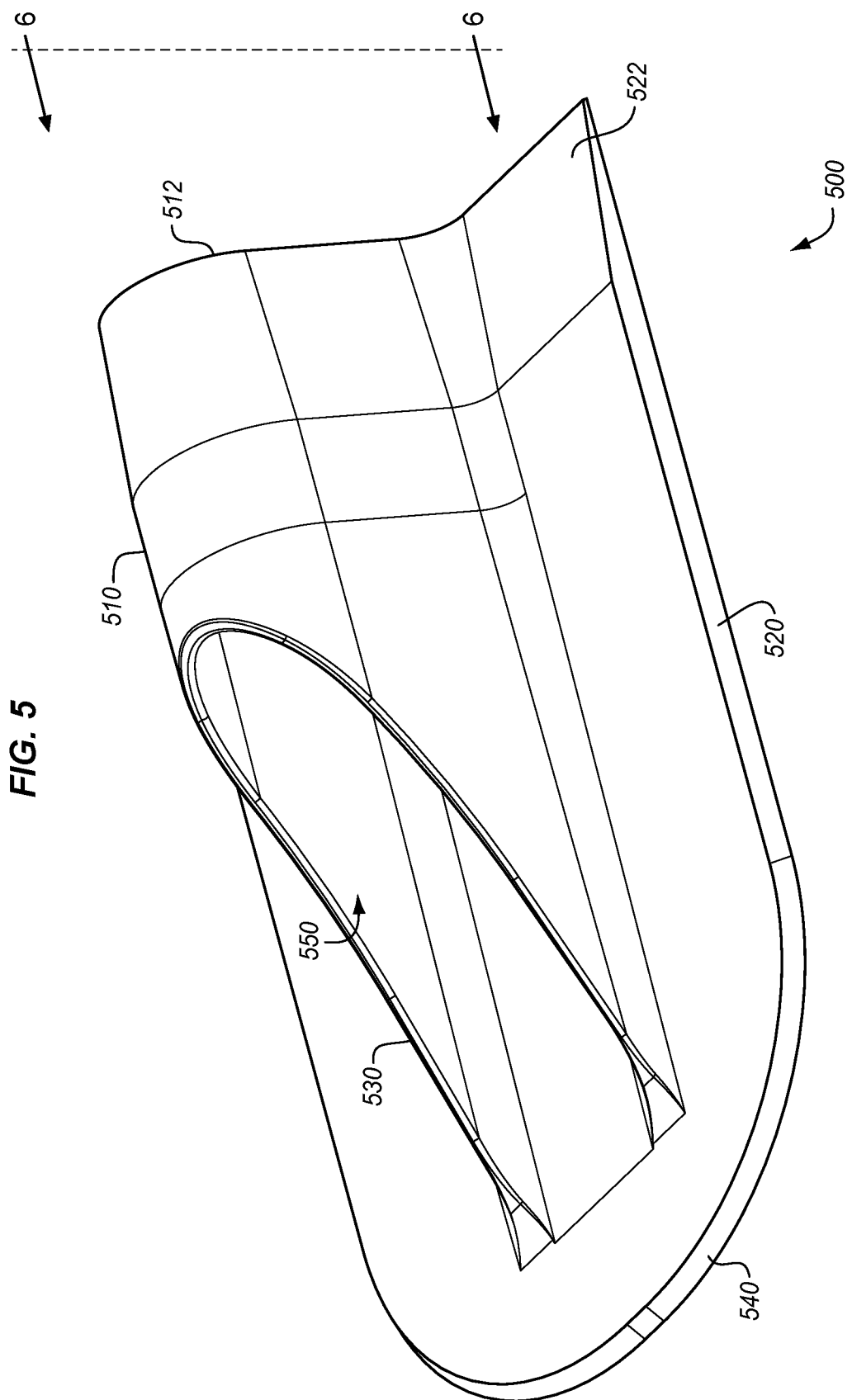
FIGS. 5-6 illustrate an end cap for a second stringer shape in an illustrative embodiment.

The end cap 300 includes a web 310 which narrows via ramp 312, which extends from the web 310 and tapers the web 310. In this embodiment, the web 310 forms a vertical plane. However, in further embodiments the web forms a curved shape (e.g., as shown in FIG. 5). The web 310 protrudes from a lower flange 320. Lower flange 320 narrows via ramp 322, which extends from the lower flange 320 and tapers the lower flange 320. These ramps 312 and 322 are overlapped by corresponding ramps in the stringer preform, such that an overall thickness of the combination of flange and stringer preform remains constant along the flange. In further embodiments, the ramps exhibit a stairstep pattern that accommodates a step lap or other type of interface/transition between the stringer and the end cap. In still further embodiments, interleaving of composite plies with metallic structure is performed to narrow the structure instead of narrowing in a linear ramped fashion. Ramp 330 terminates the stringer in accordance with desired structural constraints, and is shaped and tapered to help transition the stringer load through the end cap to the panel. Ramp 340 transfers forces through the end cap 300 into a skin panel (not shown). Meanwhile, the ramp 312 proceeding into the web 310, and the ramp 322 proceeding into the lower flange 320 transfer load from the stringer. The rate of transition of load through the end cap is established by the geometry and of the ramps and the pattern (e.g., linear, step, etc.) of the ramps.

Figure 4B:
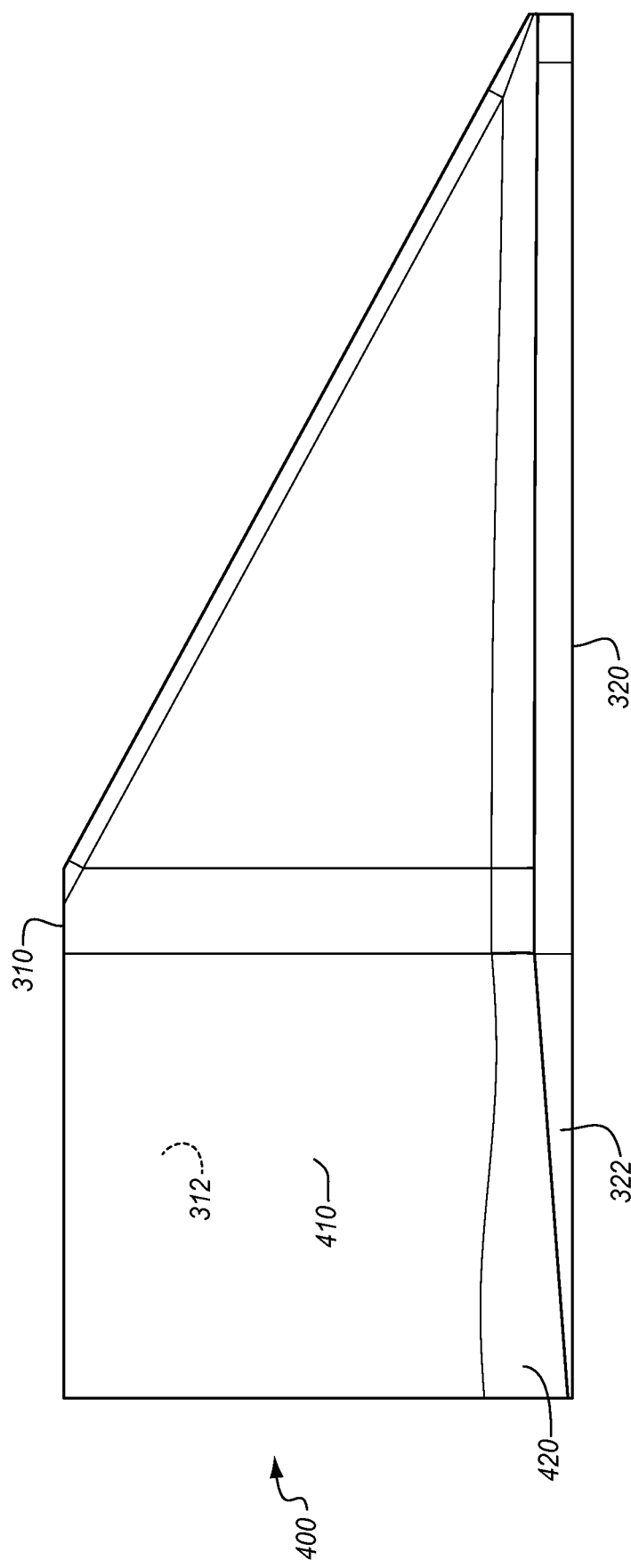
Figure 4C:
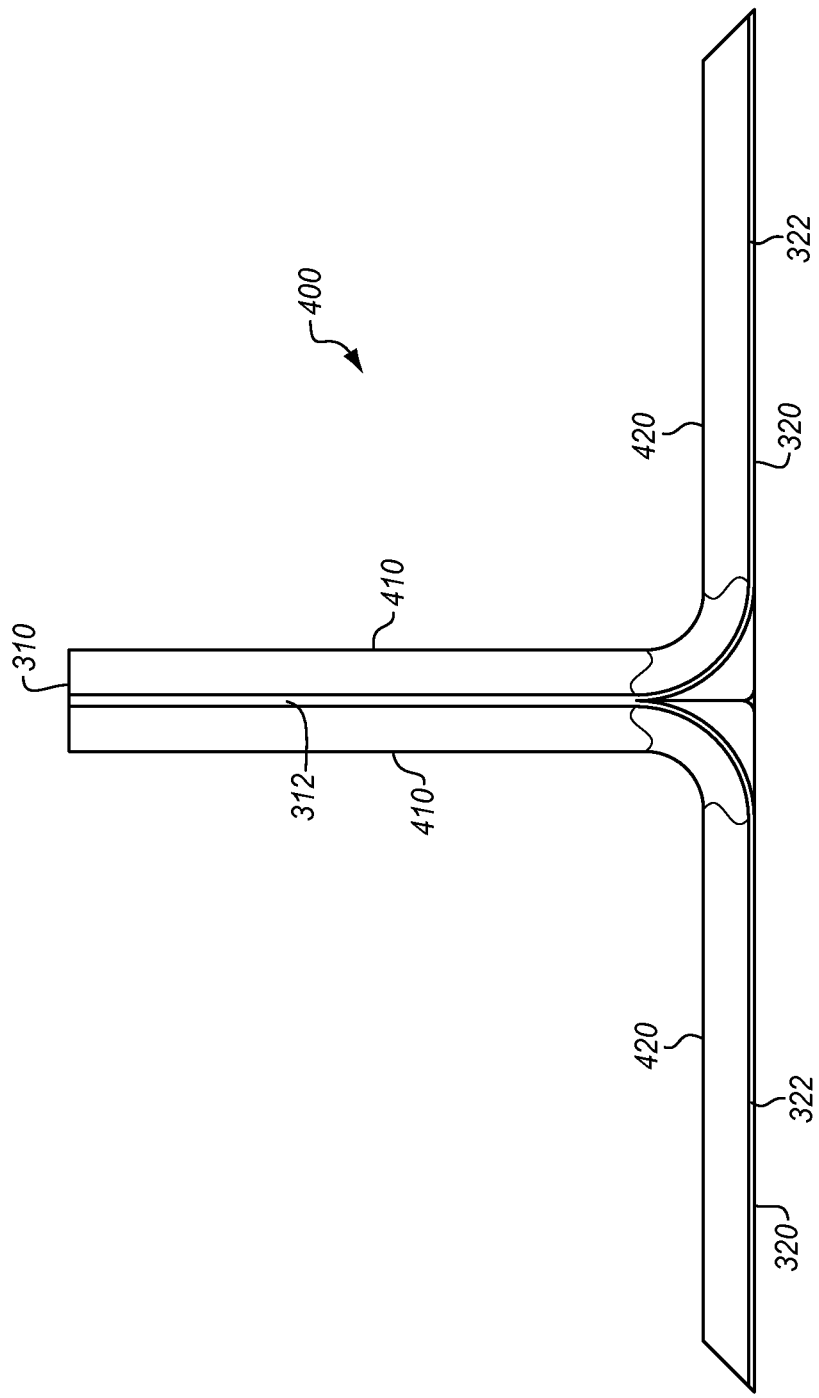

FIG. 4B depicts a section-cut side view of the end cap 300 of FIG. 3, after a stringer 400 has been bonded thereto. FIG. 4B corresponds with view arrows 4B of FIG. 4A. In FIG. 4B, it can be seen that stringer 400 includes ramp 410 and ramp 420, which mate with ramps 312 and 322, respectively. FIG. 4C is a section cut end view that corresponds with view arrows 4C of FIG. 4A. In FIG. 4C ramps 312 and 322 of end cap 300 are visible, as are ramps 410 and 420 of stringer 400. In further embodiments the end cap is bonded to an outboard end of the stringer preform and fastened to the wing panel, and another end cap is bonded to an inboard end of the stringer preform and fastened to the wing panel.

Figure 6:
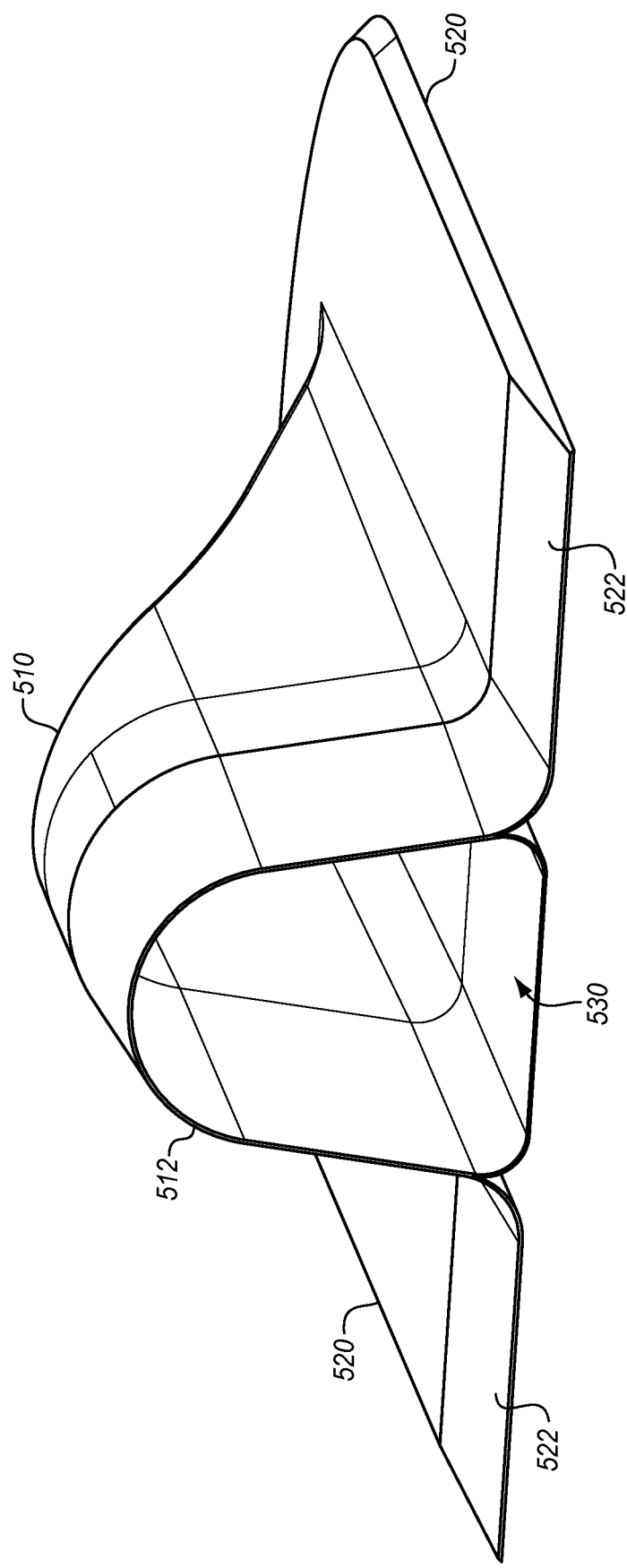

FIGS. 5-6 illustrate an end cap 500 for a second stringer shape in an illustrative embodiment. FIG. 6 corresponds with view arrows 6 of FIG. 5. In this embodiment, the end cap 500 is designed as an end cap for a stringer having a "hat" shaped cross-section. That is, the end cap 500 has a hat-shaped cross-section that aligns with a hat-shaped cross section of a stringer.

The end cap 500 includes an upper arch 510 which narrows via ramp 512, and also includes a lower flange 520, which narrows via ramp 522. These flanges are overlapped by corresponding ramps in the stringer preform, such that an overall thickness of the combination of flange and stringer preform remains constant along the flange. In further embodiments, the ramps exhibit a stairstep pattern as they narrow, instead of narrowing in a linear fashion. Ramp 530 terminates the stringer in accordance with desired structural constraints, and lip 540 distributes forces borne through the end cap 500 into a skin panel (not shown). In this embodiment, the upper arch 510 forms a void 550 which corresponds with a void in the hat stringer.

FIGS. 7A-7E and 8 illustrate an end cap 500 that has been co-bonded to a stringer 700 in an illustrative embodiment. FIG. 8 is a side view corresponding with view arrows 8 of FIG. 7A. In this embodiment, ramp 512 and ramp 522 are covered by fiber-reinforced material from the stringer 700, which forms a corresponding instance of a ramp 710 to maintain a desired combined thickness of the stringer and end cap.

Figure 7B:
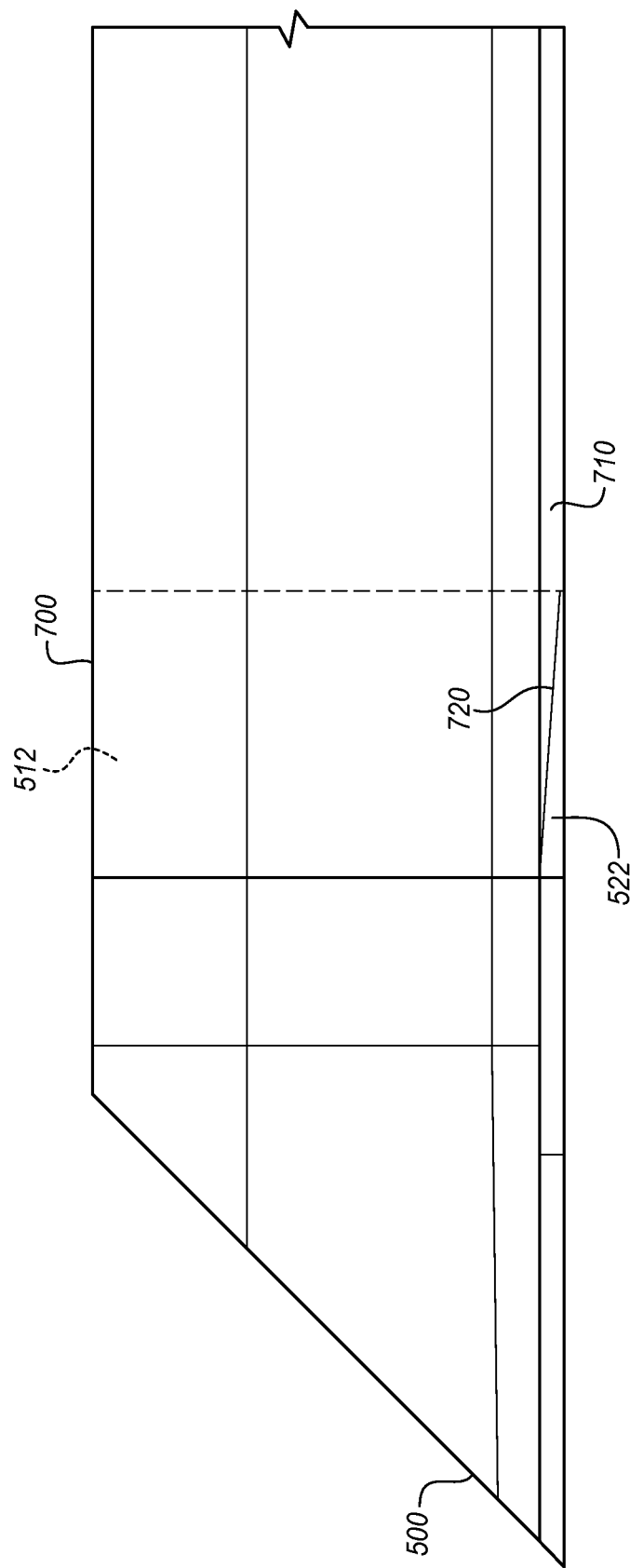

FIG. 7B is a section-cut side view that corresponds with view arrows 7B of FIG. 7A, and depicts the ramp 710 intersecting with ramp 522 of FIG. 7A at scarf joint 720. In FIG. 7B, the end cap has been bonded to a ramp of a stringer 700, which structurally unites the stringer 700 with the end cap 500, forming a single component made from the stringer as well as the end cap. Specifically, FIG. 7B depicts a scarf type of join between the ramp of the end cap and the composite plies. However, a step type of join can also be implemented, as depicted by step joint 730 of FIG. 7C. In further embodiments, the end cap is interleaved with composite plies, as shown by interleaved joint 740 of FIG. 7D. Still further implementations of interleaving may also or alternatively be utilized.

FIG. 7E is a section-cut end view that corresponds with view arrows 7E of FIG. 7A. This view further depicts and intersection between ramps for an end cap and ramps for a stringer. As shown in FIG. 7E, a portion of the stringer 700 overlaps with the ramp 512 and ramp 522 of the end cap 500.

FIG. 8 depicts a side view that corresponds with view arrows 8 of FIG. 7A. In FIG. 8, it can be observed that a majority of the join (i.e., proceeding into the page between the ramp 710 and the ramp 522) is hidden from view.

Figure 9:
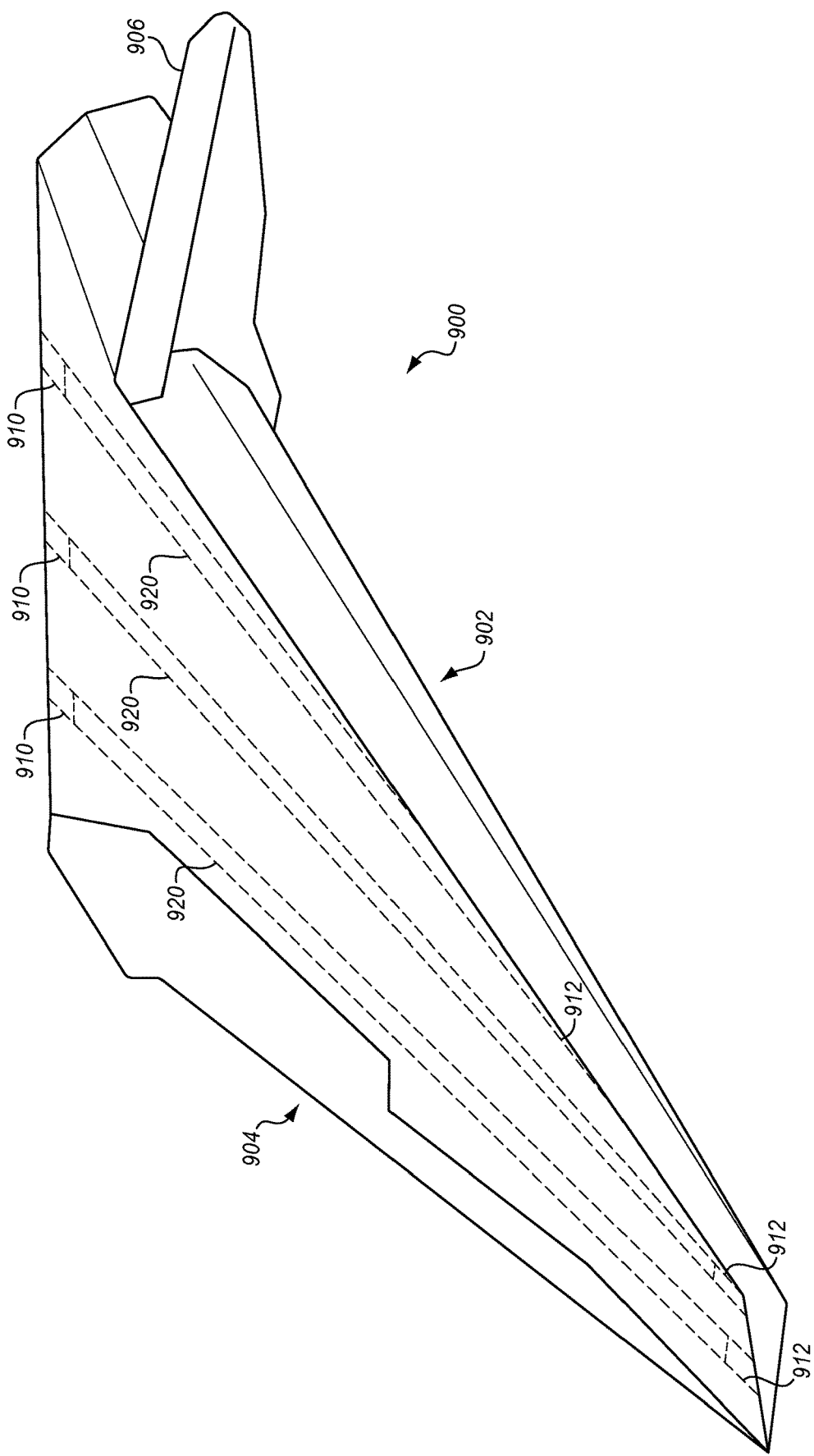
FIG. 9 is a perspective view of a wing that includes flyaway tooling in an illustrative embodiment.

FIG. 9 is a perspective view of a wing 900 that includes flyaway tooling in an illustrative embodiment. The tooling comprises end caps that facilitated hardening of the stringers by supporting the stringers during curing, and that became physically integral with the stringers after hardening. Therefore, the tooling is flyaway tooling because it is integrated into an aircraft and "flies away" as part of the aircraft after fabrication has completed. Thus, each end cap plays a dual role as tooling that supports preforms prior to and during curing, and also as a component that transfers load from the stringer into the panel when integrated into an aircraft.

FIG. 9 illustrates that the wing 900 includes leading edge 902, trailing edge 904, and pylon 906. Wing 900 further includes stringers 920, as well as inboard end caps 910 and outboard end caps 912 disposed at the inboard and outboard ends of the stringers 920. For example, the inboard end caps 910 may terminate a stringer 920 at a side-of-body intersection to form an inboard end of a stringer 920, and the outboard end caps 912 may terminate an outboard end of a stringer 920. In one embodiment, outboard end caps are smaller than inboard end caps, because they mate with tapered portions of the stringers 920. In such an embodiment inboard end caps do not taper into a skin panel, but rather are bonded or fastened to a wing box. Such end caps still taper into the stringers themselves, however. Because FIG. 9 provides a simplified view, it will be understood that there can be many more stringers than illustrated, and stringers can be much narrower relative to wing size. For example, a stringer can taper from inboard end to outboard end. Also, some of the stringers may continue to the tip of the wing while others terminate earlier.

Figure 10:
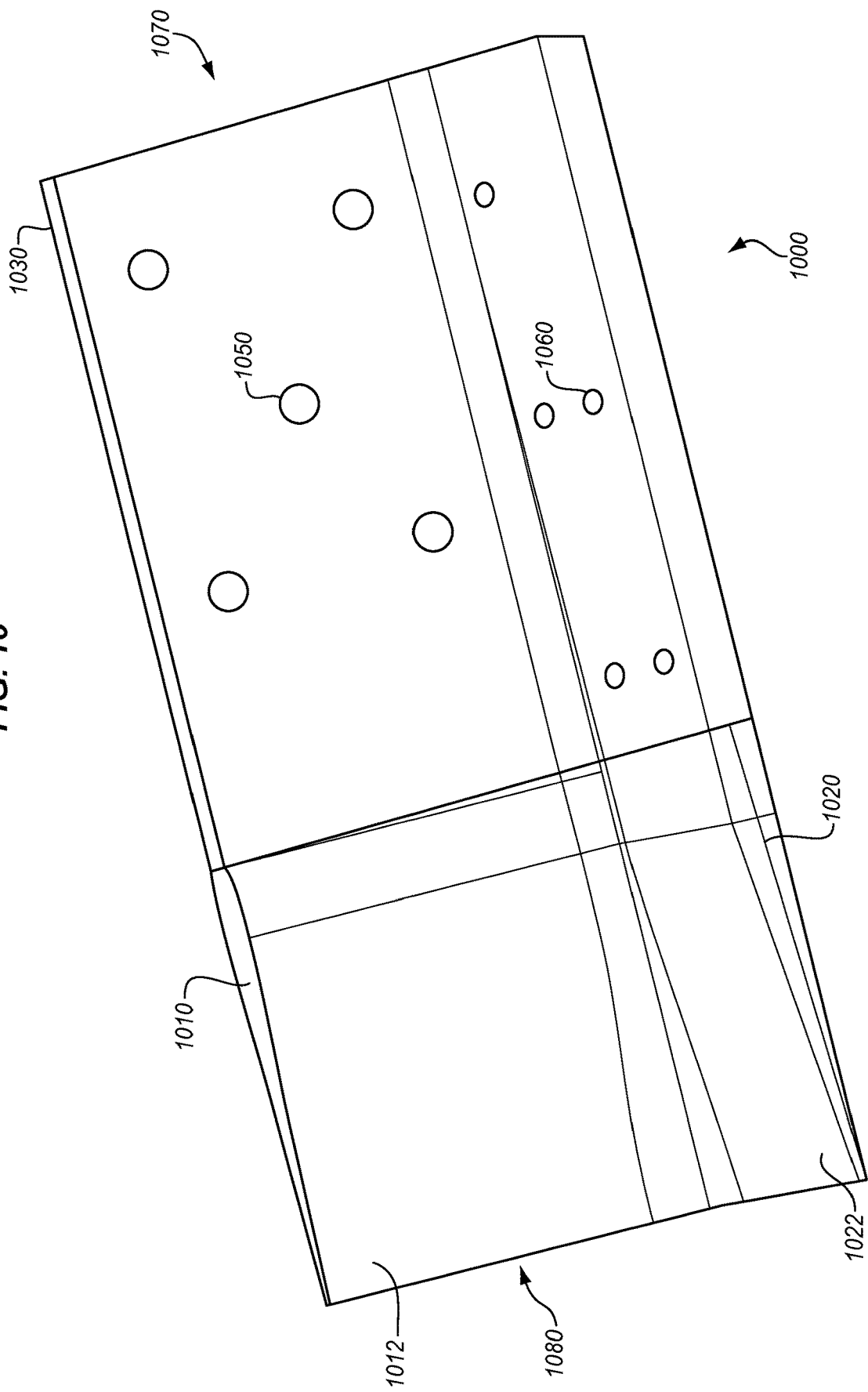
FIG. 10 illustrates an inboard end cap for a stringer in an illustrative embodiment.

FIG. 10 illustrates an inboard end cap 1000 for a stringer in an illustrative embodiment. In this embodiment, the inboard end cap 1000 is designed as an end cap for a stringer having a T-shaped cross-section. That is, the end cap 1000 has a T-shaped cross-section that aligns with a T-shaped cross section of an inboard end of a stringer.

The inboard end cap 1000 includes a web 1010 which narrows via ramp 1012, which extends from the web 1010 and tapers the web 1010. In this embodiment, the web 1010 forms a vertical plane. The web 1010 protrudes from a lower flange 1020. Lower flange 1020 narrows via ramp 1022, which extends from the lower flange 1020 and tapers the lower flange 1020. These ramps 1012 and 1022 are overlapped by/spliced with corresponding ramps in the stringer preform, such that an overall thickness of the combination of flange and stringer preform remains constant along the flange at end 1080. In further embodiments, the ramps exhibit a stairstep pattern that accommodates a step lap or other type of interface/transition between the stringer and the end cap. In still further embodiments, interleaving of composite plies with metallic structure is performed to narrow the structure instead of narrowing in a linear ramped fashion. Web extension 1030 terminates the stringer by abutting against a side of body intersection at end 1080 to transfer load from a wing box. Meanwhile, the ramp 1012 proceeding into the web 1010, and the ramp 1022 proceeding into the lower flange 1020 transfer load from the stringer to a center of the wing box. The rate of transition of load through the end cap is established by the geometry and of the ramps and the pattern (e.g., linear, step, etc.) of the ramps and web extension.

FIG. 10 further depicts mounting features 1050 in the web and mounting feature 1060 in the flange at the inboard end cap 1000. These mounting features (e.g., bolt holes for fasteners, protrusions, etc.) facilitate the process of affixing the inboard end cap 1000 to a center wing box.

Figure 11:
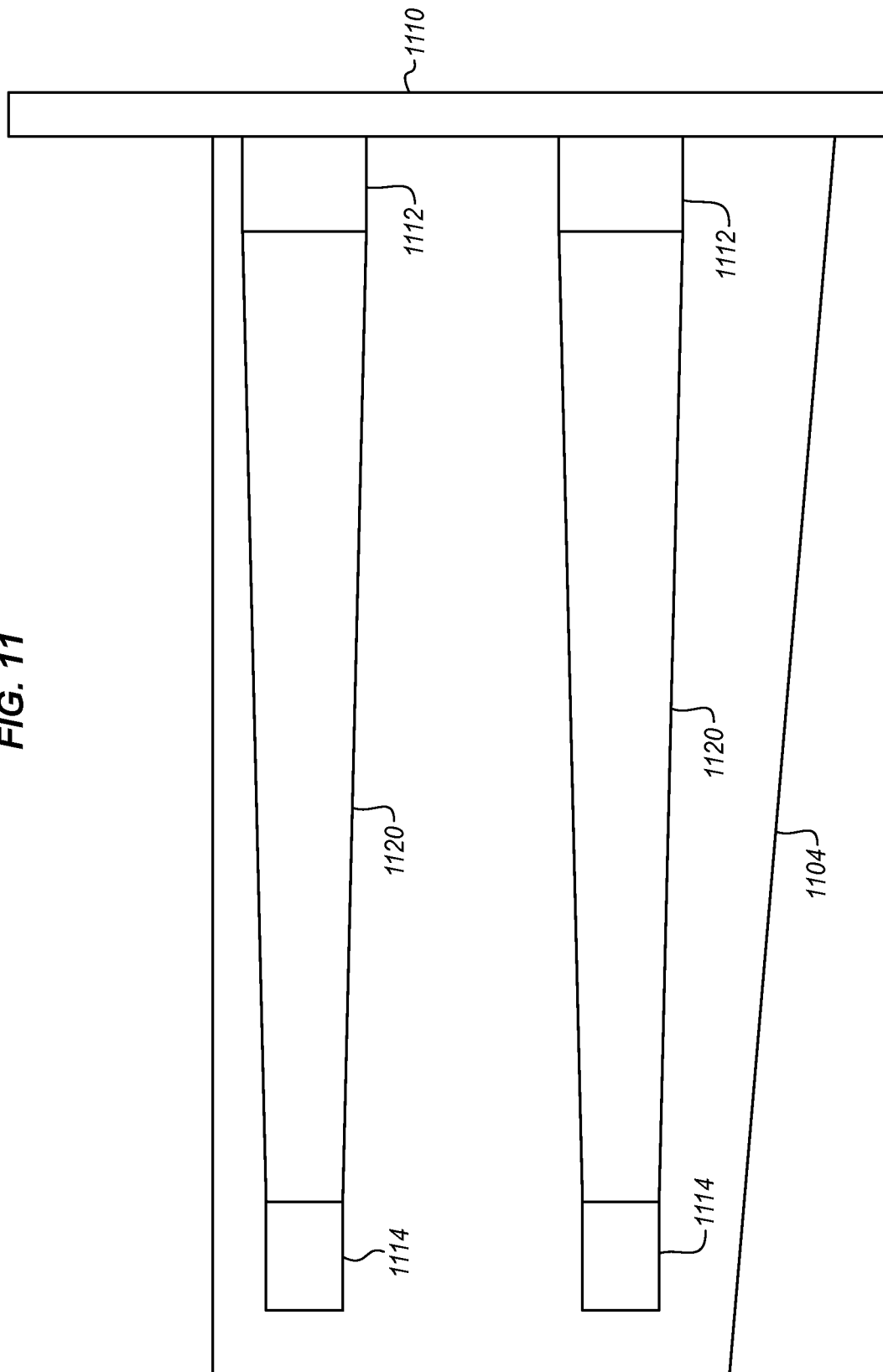
FIG. 11 is a block diagram illustrating inboard end caps for stringers integrated into an airframe in an illustrative embodiment.

FIG. 11 is a block diagram illustrating inboard end caps for stringers integrated into an airframe in an illustrative embodiment. In FIG. 11, a side of body 1110 of an airframe is abutted by inboard end caps 1112. Stringers 1120 are attached to the inboard end caps 1112, and are also attached to outboard end caps 1114. The stringers 1120 and end caps are also affixed to a skin panel 1104.

Figure 12:
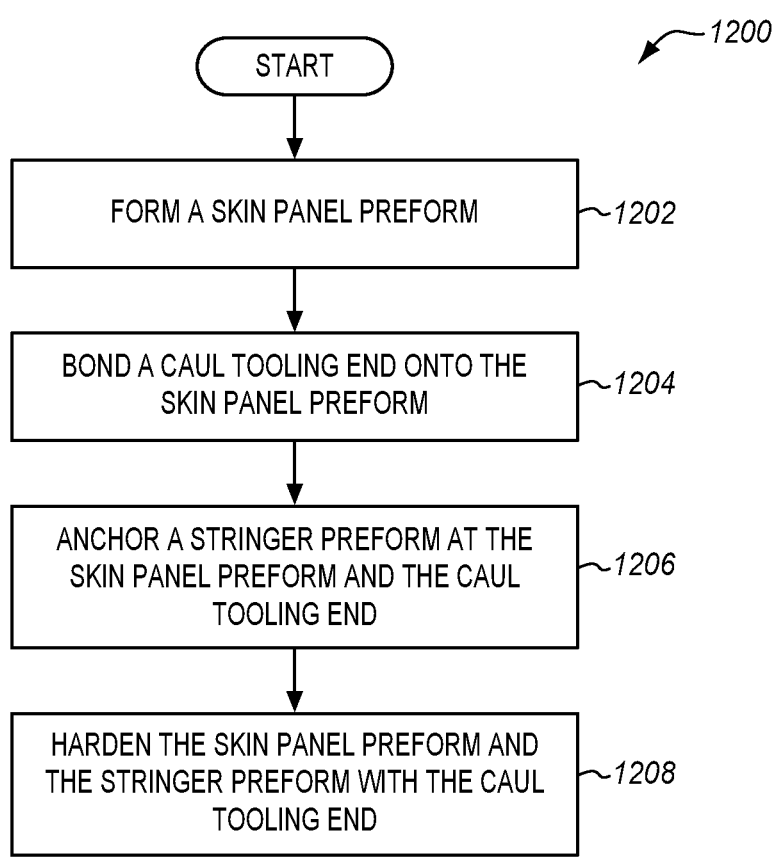
FIG. 12 is a further flowchart illustrating a method for integrating flyaway tooling into a wing in an illustrative embodiment.

FIG. 12 is a further flowchart illustrating a method for integrating flyaway tooling into a wing in an illustrative embodiment. Step 1202 comprises forming a skin panel preform via layup or other techniques. Step 1204 comprises bonding a caul tooling end (e.g., an end cap) onto the skin panel preform. Step 1206 comprises anchoring a stringer preform at the skin panel preform and the caul tooling end. Step 1208 comprises hardening the skin panel preform and the stringer preform with the caul tooling end. That is, while the skin panel preform and the stringer preform are supported by the caul tooling end, they are hardened into a composite part. In a further embodiment, vacuum bagging is performed prior to hardening, and this process includes vacuum bagging the stringer preform, the caul tooling end, and the skin panel preform. In one embodiment, hardening comprises curing the stringer preform, the caul tooling end, and the skin panel preform into a composite part while applying pressure. In a further embodiment, the caul tooling end forms flyaway tooling that structurally supports ends of a stringer. In a further embodiment, the caul tooling end comprises a material selected from the group consisting of metal and Carbon Fiber Reinforced Polymer (CFRP).

EXAMPLES

In the following examples, additional processes, systems, and methods are described in the context of end caps used as flyaway tooling for stringers.

Figure 13:
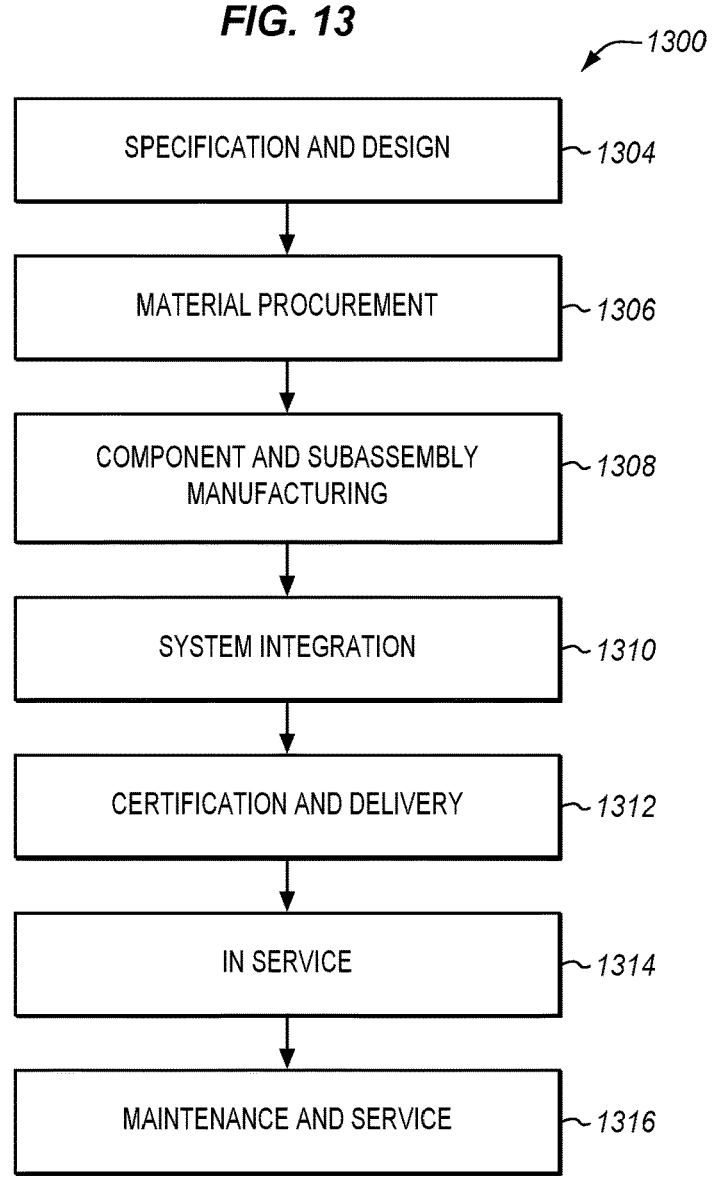
FIG. 13 is a flow diagram of aircraft production and service methodology in an illustrative embodiment.
Figure 14:
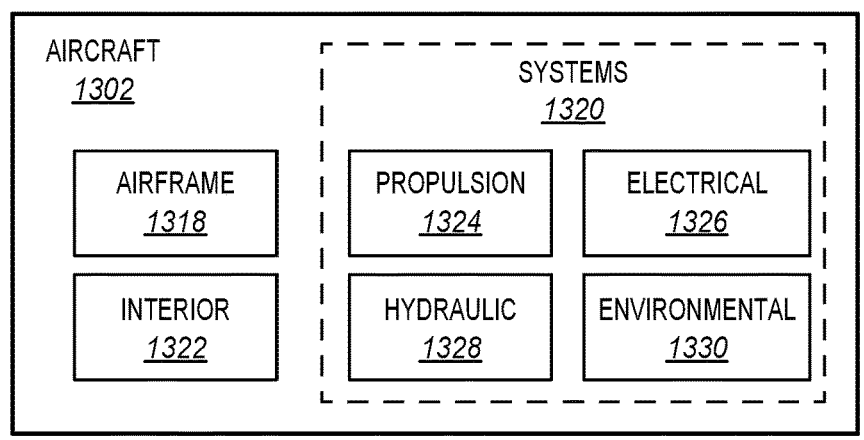
FIG. 14 is a block diagram of an aircraft in an illustrative embodiment.

Referring more particularly to the drawings, embodiments of the disclosure may be described in the context of aircraft manufacturing and service in method 1200 as shown in FIG. 12 and an aircraft 1202 as shown in FIG. 13. During pre-production, method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine work in maintenance and service 1216 (which may also include modification, reconfiguration, refurbishment, and so on). Apparatus and methods embodied herein may be employed during any one or more suitable stages of the production and service described in method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion system 1224, electrical system 1226, hydraulic system 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1202 produced by method 1200 may include an airframe 1218 with a plurality of systems 1220 and an interior 1222. Examples of systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1200. For example, components or subassemblies corresponding to component and subassembly manufacturing 1208 may be fabricated or manufactured in a manner similar to components or subassemblies produced while the aircraft 1202 is in service. Also, one or more apparatus embodiments, method embodiments, or a combination thereof may be utilized during the subassembly manufacturing 1208 and system integration 1212, for example, by substantially expediting assembly of or reducing the cost of an aircraft 1202. Similarly, one or more of apparatus embodiments, method embodiments, or a combination thereof may be utilized while the aircraft 1202 is in service, for example and without limitation during the maintenance and service 1216. Thus, the invention may be used in any stages discussed herein, or any combination thereof, such as specification and design 1204, material procurement 1206, component and subassembly manufacturing 1208, system integration 1210, certification and delivery 1212, service 1214, maintenance and service 1216 and/or any suitable component of aircraft 1202 (e.g., airframe 1218, systems 1220, interior 1222, propulsion system 1224, electrical system 1226, hydraulic system 1228, and/or environmental 1230.)

In one embodiment, a part comprises a portion of airframe 1218, and is manufactured during component and subassembly manufacturing 1208. The part may then be assembled into an aircraft in system integration 1210, and then be utilized in service 1214 until wear renders the part unusable. Then, in maintenance and service 1216, the part may be discarded and replaced with a newly manufactured part. Inventive components and methods may be utilized throughout component and subassembly manufacturing 1208 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a composite part, the method comprising:
forming a skin panel preform comprising fiber reinforced material;
disposing rigid end caps at the skin panel preform at end locations of stringer preforms that will be placed at the skin panel preform;
locating the stringer preforms at the skin panel preform via the rigid end caps disposed at the skin panel preform; and
anchoring the stringer preforms to the skin panel preform between the rigid end caps.

2. The method of claim 1 further comprising:
consolidating the stringer preforms and the skin panel preform via a vacuum bag that covers the stringer preforms, the skin panel preform, and the end caps.

3. The method of claim 1 further comprising:
hardening the stringer preforms and the skin panel preform to form a section of wing that includes the end caps.

4. The method of claim 1 further comprising:
bonding the end caps to the stringer preforms.

5. The method of claim 1 further comprising:
bonding the end caps to the skin panel preform.

6. The method of claim 1 further comprising:
fastening the end caps to the skin panel preform.

7. The method of claim 1 further comprising:
co-curing the stringer preform and the skin panel preform while the rigid end caps are bonded to the stringer preform and the skin panel preform, resulting in a composite part that includes the end cap.

8. The method of claim 1 further comprising:
laying up the skin panel preform from Carbon Fiber Reinforced Polymer (CFRP).

9. The method of claim 1 further comprising:
laying up the stringer preforms from Carbon Fiber Reinforced Polymer (CFRP).

10. The method of claim 1 wherein:
locating a stringer preform comprises abutting the stringer preform against an end cap.

11. A portion of an aircraft assembled according to the method of claim 1.

12. The method of claim 1 wherein:
locating the stringer preforms at the skin panel preform comprises aligning cross-sections of the stringer preforms with cross-sections of the end caps.

13. The method of claim 1 further comprising:
directing a Pick and Place (PNP) machine to place the stringer preforms onto the skin panel preform.

14. The method of claim 13 further comprising:
utilizing a Numerical Control (NC) program to direct the PNP machine.

15. The method of claim 1 wherein:
locating the stringer preforms at the skin panel preform comprises overlapping ramps of the end caps with one or more layers of the stringer preforms.

16. The method of claim 1 further comprising:
transferring loads between a ramp of a stringer preform and an end cap.

17. The method of claim 1 further comprising:
waiting for an adhesive to harden after locating the stringer preforms at the skin panel preform.

18. The method of claim 1 further comprising:
placing the stringer preforms and the skin panel preform into an autoclave.

19. The method of claim 1 further comprising:
aligning the stringer preforms with stairstep patterns at the end caps.

20. The method of claim 1 further comprising:
interleaving composite plies of the stringer preforms with a metallic structure of the end caps.

* * * * *